United States Patent
Crist

(10) Patent No.: US 9,619,839 B2
(45) Date of Patent: Apr. 11, 2017

(54) SYSTEMS AND METHODS FOR VIEWING AND TRADING FUTURES

(75) Inventor: Jeff Crist, Glenview, IL (US)

(73) Assignee: ITG SOFTWARE SOLUTIONS, INC., Culver City, CA (US)

( * ) Notice: Subject to any disclaimer, the term of this patent is extended or adjusted under 35 U.S.C. 154(b) by 768 days.

(21) Appl. No.: 12/371,070

(22) Filed: Feb. 13, 2009

(65) Prior Publication Data

US 2009/0292633 A1    Nov. 26, 2009

Related U.S. Application Data

(60) Provisional application No. 61/064,052, filed on Feb. 13, 2008.

(51) Int. Cl.
*G06Q 40/00* (2012.01)
*G06Q 40/04* (2012.01)
*G06Q 40/06* (2012.01)
*G06Q 30/08* (2012.01)

(52) U.S. Cl.
CPC ............ *G06Q 40/04* (2013.01); *G06Q 40/06* (2013.01); *G06Q 30/08* (2013.01); *G06Q 40/00* (2013.01)

(58) Field of Classification Search
CPC ........ G06Q 40/00; G06Q 40/04; G06Q 40/06; G06Q 30/08
USPC .......................................................... 705/37
See application file for complete search history.

(56) References Cited

U.S. PATENT DOCUMENTS

| | | | | |
|---|---|---|---|---|
| 6,141,778 A * | 10/2000 | Kane | ..................... | G06F 21/604 726/4 |
| 6,633,223 B1 * | 10/2003 | Schenker | ................. | G07C 1/10 340/5.53 |
| 6,766,304 B2 | 7/2004 | Kemp, II et al. | | |
| 6,772,132 B1 | 8/2004 | Kemp, II et al. | | |
| 6,889,198 B2 * | 5/2005 | Kawan | ................. | G06Q 20/105 705/14.27 |
| 7,228,289 B2 * | 6/2007 | Brumfield | .............. | G06Q 40/04 345/440.2 |
| 7,373,327 B1 | 5/2008 | Kemp et al. | | |
| 7,389,258 B2 | 6/2008 | Brumfield et al. | | |

(Continued)

OTHER PUBLICATIONS

Wasendorf Sr, R. R. (1009). Method and apparatus for on-line trading display Retrieved from http://dialog.proquest.com/professional/docview/787177612?accountid=142257 on Nov. 23, 2016.*

(Continued)

*Primary Examiner* — Kito R Robinson
(74) *Attorney, Agent, or Firm* — Rothwell, Figg, Ernst & Manbeck, P.C.

(57) ABSTRACT

A method and system for viewing and trading futures and other tradeable objects. The invention includes improved user interfaces for use with trading systems that allows users to more efficiently execute and manage trades. A dynamic price ladder allows a trader to see price gaps while remaining in a dynamic mode. The "sticky cells" feature prevents user errors which can occur when the display updates causing the cell under the mouse pointer to move up or down. Particular portions of the display can be color coded to provide a user with a easy way to determine market trends. A static working order screen allows a trader to visually see working orders from closest to furthest away from the market and can also allow for orders to be cancelled.

47 Claims, 22 Drawing Sheets

(56) References Cited

U.S. PATENT DOCUMENTS

| | | | |
|---|---|---|---|
| 7,389,264 B2 | 6/2008 | Kemp, II et al. | |
| 7,389,268 B1 | 6/2008 | Kemp, II et al. | |
| 7,389,269 B1* | 6/2008 | Robinson | G06Q 20/40145 705/50 |
| 7,392,219 B2 | 6/2008 | Singer et al. | |
| 7,412,416 B2 | 8/2008 | Friesen et al. | |
| 7,418,422 B2 | 8/2008 | Burns | |
| 7,447,655 B2 | 11/2008 | Brumfield et al. | |
| 7,496,536 B2* | 2/2009 | Lasater et al. | 705/38 |
| 7,580,881 B2* | 8/2009 | Singer et al. | 705/37 |
| 7,756,775 B1* | 7/2010 | Ebersole et al. | 705/37 |
| 7,792,736 B2* | 9/2010 | Wasendorf, Sr. | G06Q 30/08 379/137 |
| 7,805,355 B2* | 9/2010 | Wigzell | 705/37 |
| 8,161,414 B2* | 4/2012 | Schluetter et al. | 715/858 |
| 8,225,386 B1* | 7/2012 | de Jong | G06Q 20/3552 713/184 |
| 8,401,965 B2* | 3/2013 | Johnson | G06Q 20/10 370/332 |
| 2001/0047336 A1* | 11/2001 | Maycock, Jr. | G06Q 20/04 705/44 |
| 2002/0077962 A1* | 6/2002 | Donato et al. | 705/37 |
| 2003/0023536 A1 | 1/2003 | Hollerman | |
| 2003/0189670 A1* | 10/2003 | Kennedy | H04N 7/17318 348/601 |
| 2004/0193541 A1* | 9/2004 | Lasater | G06Q 20/04 705/39 |
| 2005/0080711 A1 | 4/2005 | Mah | |
| 2005/0125328 A1* | 6/2005 | Schluetter | G06F 3/04812 705/37 |
| 2006/0069635 A1* | 3/2006 | Ram et al. | 705/37 |
| 2006/0129474 A1* | 6/2006 | Kelly | 705/37 |
| 2006/0136326 A1 | 6/2006 | Heckman | |
| 2006/0155626 A1* | 7/2006 | Wigzell | G06Q 40/00 705/35 |
| 2006/0253371 A1* | 11/2006 | Rutt | G06Q 40/04 705/37 |
| 2006/0271467 A1 | 11/2006 | Wasendorf | |
| 2006/0282361 A1 | 12/2006 | Twery | |
| 2006/0287004 A1* | 12/2006 | Fuqua | G06Q 20/0658 455/558 |
| 2007/0007333 A1* | 1/2007 | Foss | G06Q 20/04 235/380 |
| 2007/0118452 A1 | 5/2007 | Mather | |
| 2007/0143198 A1 | 6/2007 | Brandes | |
| 2007/0150401 A1* | 6/2007 | Brucato | G06Q 40/04 705/37 |
| 2007/0208654 A1* | 9/2007 | Stearns | G06Q 40/04 705/37 |
| 2007/0220013 A1 | 9/2007 | Rabines | |
| 2007/0239586 A1 | 10/2007 | Inala | |
| 2007/0250436 A1 | 10/2007 | Mittal | |
| 2007/0265954 A1* | 11/2007 | Mather et al. | 705/37 |
| 2007/0282737 A1* | 12/2007 | Brasch | G06Q 40/02 705/38 |
| 2007/0294296 A1* | 12/2007 | Silver | G06Q 30/02 |
| 2008/0154787 A1 | 6/2008 | Krowas | |
| 2008/0235128 A1 | 9/2008 | Twine | |
| 2008/0249959 A1 | 10/2008 | Mittal | |
| 2009/0070171 A1* | 3/2009 | Patterson | G06Q 20/108 705/75 |
| 2009/0177553 A1* | 7/2009 | Short | G06Q 30/06 705/26.1 |
| 2010/0051691 A1* | 3/2010 | Brooks | G06Q 20/20 235/380 |
| 2010/0076906 A1 | 3/2010 | Eubank et al. | |
| 2010/0301113 A1* | 12/2010 | Bohn | G06Q 30/02 235/380 |
| 2012/0191598 A1* | 7/2012 | Marzo | G06Q 20/385 705/39 |

OTHER PUBLICATIONS

Hertzum, M., & Hornbaek, K. (2005). TouchGrid : Touchpad pointing by recursively mapping taps to smaller display regions. Behaviour & Information Technology (Print), 24(5), 337-346. Retrieved from http://dialog.proquest.com/professional/docview/625310354?accountid=142257 on Nov. 23, 2016.*

International Search Report issued on Apr. 13, 2009 in PCT/US09/34032, 2 pages.

* cited by examiner

| | |
|---|---|
| 6.75 | −40 x |
| 5.25 | −120 x |
| 4.50 | 80 x |
| 3.25 | 15 x |

Fig. 14

SYSTEMS AND METHODS FOR VIEWING AND TRADING FUTURES

CROSS-REFERENCE TO RELATED APPLICATIONS

This application claims the benefit of U.S. Provisional Application Ser. No. 61/064,052, "Systems and Methods for Viewing and Trading Futures," filed on Feb. 13, 2008, the entire contents of which are incorporated herein by reference.

BACKGROUND OF THE INVENTION

Field of the Invention

The present invention relates generally to the field of systems for buying and selling tradeable assets. More particularly, the present invention relates to computerized systems and methods for displaying information about tradeable assets and allowing a user to interact with the display to effect trades.

Description of the Related Art

Through the years, methods for trading financial instruments, such as securities or derivatives, have evolved from manual, paper-intensive processes to electronic, often automated processes. Advances in technology have reshaped the way in which both exchanges and trading institutions conduct business. As a result, traders can directly contact the market from nearly anywhere and in near real-time, without the need to make personal contact with a broker.

Because most exchanges throughout the world now support electronic trading systems, a larger number of traders participate within the markets at any given time. The increase in the number of potential traders has led to more competition, liquidity, and volatility. As a result, the speed at which traders can receive data (i.e., market data) and submit trade orders to exchanges has become of great importance.

There are generally two different types of electronic markets: displayed and dark (or undisplayed). Displayed markets publish data regarding bids and offers while dark markets do not publish the data. Traders typically use trading software, which includes a computer interface that displays market data (i.e., from published markets) and tracks the trader's market positions (e.g., portfolio of investments, pending orders, contemplated orders, etc.). Such trading applications may include interactive screens that enable traders to obtain market quotes, to enter and execute orders, and monitor positions while implementing various trading strategies.

Currently known trading applications have the disadvantage that they do not allow efficient execution and management of trades across multiple asset classes. Furthermore, in markets characterized by rapidly fluctuating prices, the user display must be frequently updated, which can make executing trades difficult. Thus, there is a need for new and improved systems and methods for electronic trading.

SUMMARY OF THE INVENTION

According to aspects of the present invention, a trading system is provided that may include a client application, which allows a user to view market information for a number of tradeable assets, such as commodities. This client application can be updated on a periodic basis to reflect the state of the market. Preferably, updates occur quickly and in near real-time. Aspects of the invention related to novel ways to display trade data and features for interactive trading based on the displayed data. Bids and offers (also called "asks") existing in the marketplace can be displayed along with the orders a user has placed. The marketplace could consist of one or more exchanges, alternative trading systems (ATSs), Electronic Crossing Networks (ECNs) or similar systems. Market movement and other information are indicated using various visual techniques. This client application could be executed on the user's computer or implemented as a web application which the user would access via a browser. This client interface could be configured to execute in conjunction with an execution management system (EMS) or an order management system (OMS.)

According to an embodiment of the present invention, the client application may include a futures window having a Dynamic Price Ladder with the ability to show price gaps while staying in a dynamic model. This feature allows a trader to view "tick" gaps and to place orders within the market where there are no resting bids or offers. Current systems only publish on the 5 best bids and offers regardless of liquidity price gaps.

According to an embodiment of the present invention, the futures window includes "Sticky Cell" and timer functionality for order entry within the Bid, Ask, or Price column of the futures window. This feature enables traders to trade at a the price they choose within a dynamic price ladder instead of trading the current price, no matter what the price is, within the cell the trader clicks on. This sticky cell functionality, also allows a trader to place a limit bid or offer above or below the market at a certain price. The price the "Sticky Cell" can be locked on will be the limit price of the order.

According to an embodiment of the present invention, the client application can be configured such that input from a peripheral device, such as a mouse, can be used to create indicators within the futures window. A middle mouse click or other user input may highlight/color code the dynamic price ladder to feel the ebb and flow of the market. By clicking on the middle mouse wheel or button, the top and bottom price fully displayed within the futures window is highlighted green (top) and red (bottom). Due to the fact we are using a dynamic price ladder with the best bid and offer constantly being displayed in the middle of the trading window and price action moving the dynamic price ladder up and down, highlighting the top and bottom prices will allow a trader to feel the ups and downs (ebb and flow) of the current market conditions. The trader can also rest the highlighted prices by middle mouse wheel/button clicking.

According to an embodiment of the present invention, the client application may also include a static working order screen in addition to the dynamic price ladder in the futures window, wherein working orders are attached to a certain price, and continue to move up or down in the price ladder depending upon the movement of the market. Sometimes, working order may move outside of the visible market and traders forget they are working orders within the market. The static order pane may allow a trader to visually see working orders from closest to too furthest way from the market, even orders which are not on the visible current market. Orders may also be cancelled from this pane.

According to an embodiment of the present invention, the system may be provided with the ability to quickly cancel a pre-determined amount of working orders, based upon price. A trader can specify how many working, price level, orders can be quickly cancelled, without canceling all, canceling all bids, or canceling all offers.

According to an embodiment of the present invention, a computerized method for trading financial instruments is provided. The method includes a step of receiving over a network, data reflecting current bid and offer quantities and prices for a tradeable asset. The method further includes a step of displaying to the user current bid and offer quantities and prices for the tradeable asset in a tabular format that includes horizontally oriented rows and vertically oriented columns. Each row consists of at least three cells. The middle cell contains a possible price level for the tradeable asset, the leftmost cell contains the quantity of the current offers corresponding to the price level displayed in said middle cell, and a rightmost cell contains the quantity of the current bids corresponding to the price level displayed in said middle cell. The display is periodically updated each time new data is received. The method further includes steps of receiving first data from a user input device representing a particular cell the user input device is indicating, calculating the length of time the user input device has indicated the particular cell, storing the first data from a user input device representing the particular cell the user input device is indicating if the length of time calculated exceeds a predetermined amount of time, and receiving second data from the user input device representing a selection made by the user input device. The stored first data from the user input device is used in response to the second data representing a selection, even if the display has been updated and the user input device is now indicating a different cell.

According to an embodiment of the present invention, a trade execution management system (EMS) is provided. The EMS includes a display interface executing on a computer which is configured to receive market data for a plurality of commodities traded on a financial market via an electronic communication network. The market data can include published bid and offer data for said plurality of commodities. The EMS is further configured to generate a display which includes a dynamic price window displaying at least the bid and offer data for at least one selected commodity, including the price and quantity for each bid and offer. The EMS is further configured to receive trade order data input from an input device coupled to said computer and to transmit trade orders based on said trade order data to the financial market on which the commodity is traded. The position of each bid and offer in the display is based upon price, with the best bid and best offer being positioned at predetermined positions within the dynamic price window and being separated by a visual indicator. The position of each bid and offer is adjusted substantially near real-time when the best bid or the best offer data changes. Further aspects and embodiments of the present invention are described below.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

FIGS. 14-16 show representative portions of a graphical user interface for a computer display illustrating a static working order grid according to an embodiment of the present invention.

FIG. 18b is an expanded view of the last trade volume column shown in FIG. 18a.

DETAILED DESCRIPTION OF THE PREFERRED EMBODIMENTS

The present invention relates to the display and trading of assets or tradeable objects, which may include financial instruments, commodities, currency, and other assets that can be exchanged or traded in a marketplace. For the purposes of illustrating the invention, the disclosure often describes the invention in terms of securities, commodities, and futures. However, the invention is not meant to be limited to any particular kind of asset or tradeable object.

Figure 1:
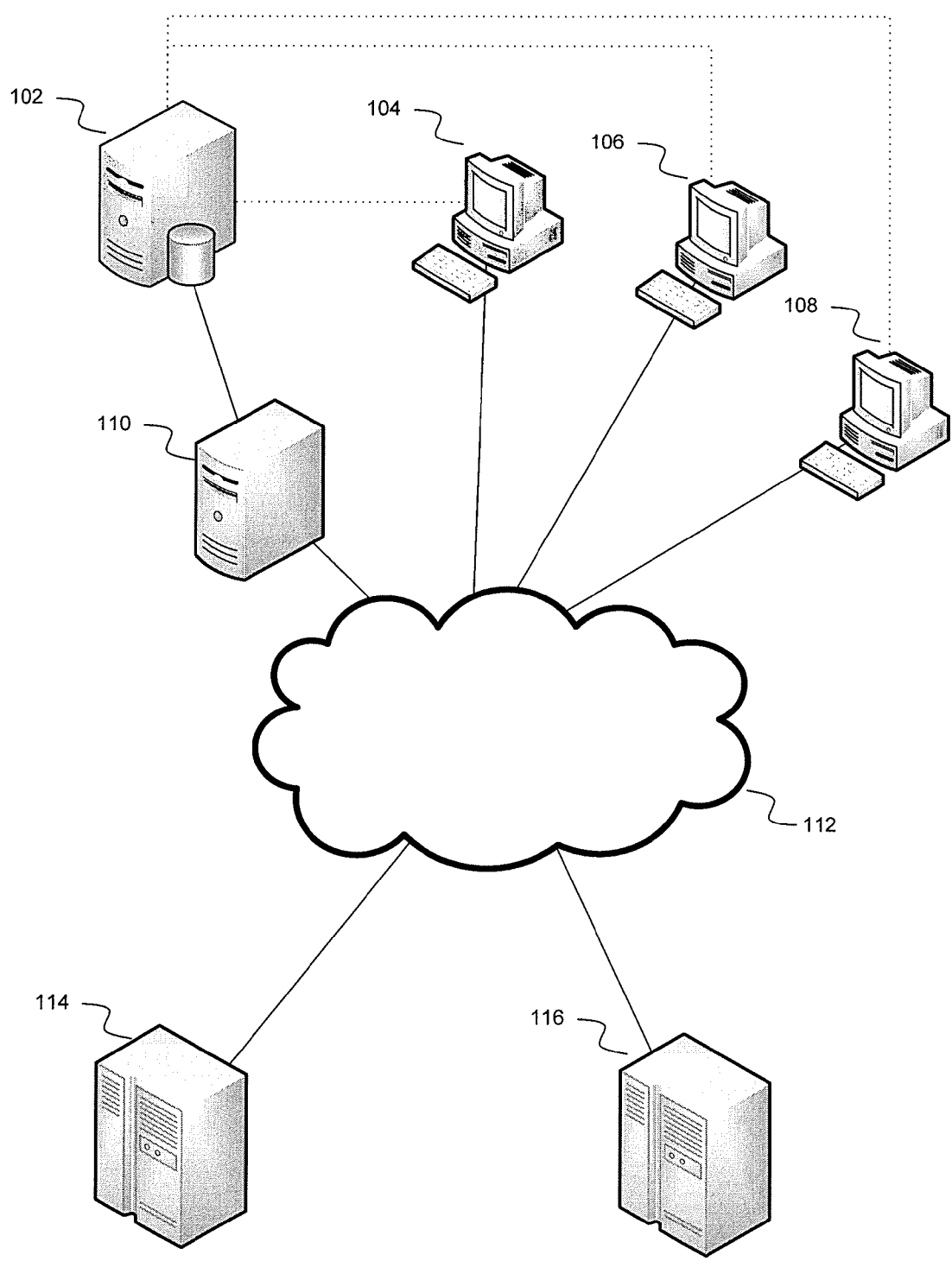
FIG. 1 is a schematic diagram illustrating a representative architecture of a system according to an embodiment of the invention.

FIG. 1 is a block diagram that illustrates an exemplary representative architecture of a tradeable object display and trading system according to an embodiment of the present invention. The system shown in FIG. 1 is provided solely for the sake of illustration and is not intended to limit the scope of the invention. Known computer architectures other than the one shown are contemplated. For example, a more centralized architecture could be utilized, or a more distributed one.

The system includes client computer workstations 104, 106, 108 that may be connected to an electronic data network 112 and are used by traders working at a trading firm. The user interface components and features described later can be accessed from these client computer workstations. The network 112 can include a local area network (LAN), wide area network (WAN), and/or the Internet. An application server 110 in communication with network 112 can be provided to host an Execution Management System (EMS), Order Management System (OMS) or similar application for managing a particular firm's trades. A database server 102 can be provided to store data relating to orders, bids, and offers for the EMS, OMS or similar application. Information regarding bids and offers being made in the market can be provided by a market data feed 114. Any trades that are made are sent over electronic data network 112 to an exchange 116.

According to an embodiment of the invention, an EMS can be provided on one or more of the workstations 104, 106, 108 that allows a trader to view market data for one or more classes of tradeable assets and to buy and sell the assets. Accordingly, a client application that performs the features of the EMS may be executed on the workstations or otherwise accessed via the workstations.

Aspects of the invention relate to novel ways to display the market data to the user and to allow the user to interact with the display to effect trades. According to one embodiment, a dynamic price ladder display mechanism or module is provided in the client interface that allows for the representation of price levels for all ticks or price levels possible for the asset or tradeable object being displayed, regardless of whether there is any volume being traded at those prices.

FIGS. 2-6 are zoomed screen shots of a graphical user interface for a computer display employing a dynamic price mechanism according to an embodiment of the present invention. A dynamic price ladder 212 can be provided and displayed to a trader within the client user interfaces as a table with asset or tradeable object price levels being displayed in a middle column 202. Each price level is contained in a separate row of the table. Columns of the table 212 represent additional information tied to the "carrying" price of the row (i.e., bid and offer quantities). Offer quantities are shown in the leftmost column 200 and bid quantities are shown in the rightmost column 204. Prices that represent levels are constructed per tick size for the asset or tradeable object.

Depending on the state of the market, there are three possible arrangements of the best prices in the ladder, as described below. The dynamic price ladder may be generated by a financial object display system (FIG. 28).

Figure 2:
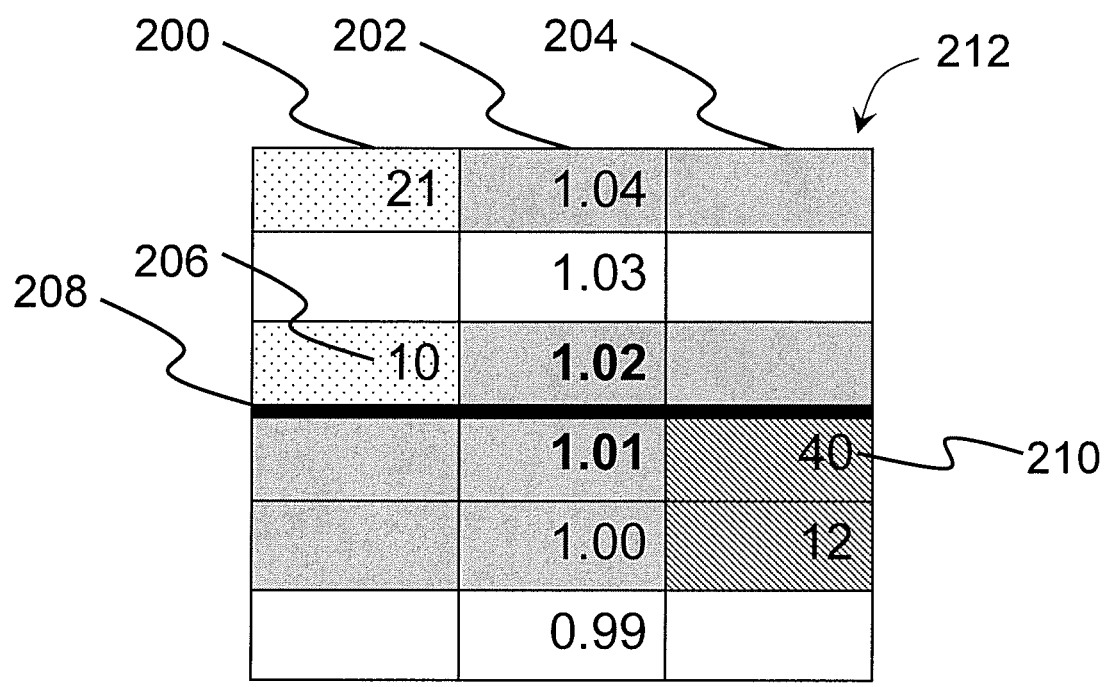
FIG. 2-6 show representative portions of a graphical user interface for a computer display including a dynamic price ladder according to an embodiment of the present invention.

First, FIG. 2 shows the dynamic price ladder 212 when the price level of the object of interest is between the best bid 210 and best offer 206 (i.e., the "ask"). A first indicator in the form of a thick division line 208 is provided that divides the best bid 210 from the best offer 206. The background of the cells containing the best bid 210 and best offer 206 are shaded with different colors or patterns in order to further highlight to the user their status. The division line 208 can be provided at a predetermined position on the display with the best ask price above the line and the best bid below the line. Preferably, the division line 208 is centered in the viewable portion of the window in which the dynamic price ladder is displayed. Ask and bid prices can be displayed in sequential order (i.e., increasing asks and decreasing bids).

Figure 3:
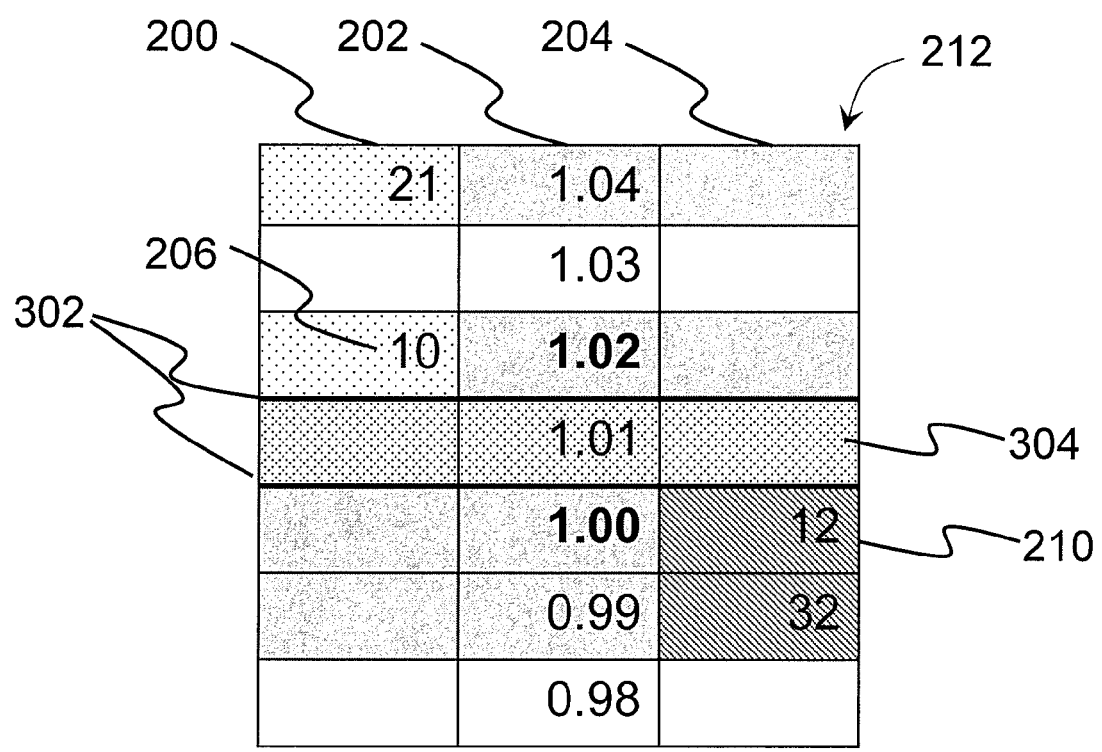

Second, FIG. 3 shows the dynamic price ladder 212 when there are one or more price levels for the tradeable object between the best bid 210 and best offer 206. The row(s) of cells 304 encompassing the region in the table between the best bid 210 and best offer 206 are preferably visually distinguished from the cells containing the best bid 210 and the best offer 206. For example, the system may vary the text attributes, border and/or background of this intermediate region to allow a user to quickly distinguish them from the cells containing the best bid 210 and best offer 206. The system may also display an indicator in the form of two division lines 302 to further delineate the row(s) of cells 304 encompassing the region between the best bid 210 and best offer 206. In an embodiment, one of the lines is disposed between the intermediate region and the best bid 210 and the other line is disposed between the intermediate region and the best offer 206, such that the cells making up the intermediate region are disposed between the lines.

Figure 4:
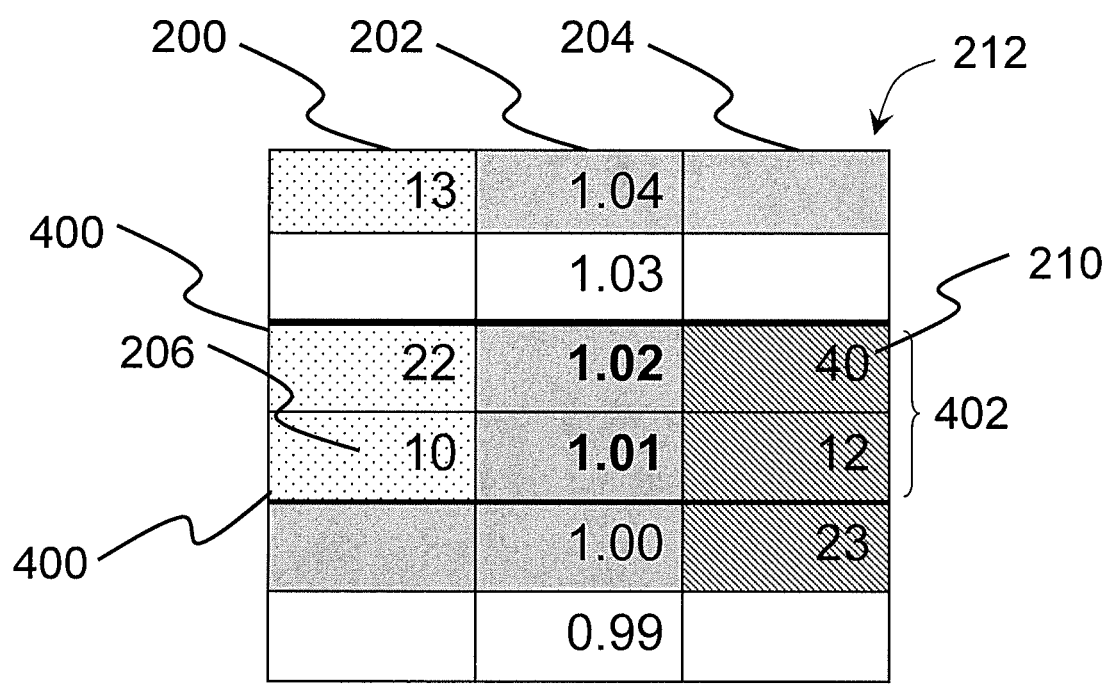

Third, FIG. 4 shows the dynamic price ladder 212 when there are one or more price levels for the tradeable object either at (or above) the best bid 210 and at (or lower) than the best offer 206. In this case, the row(s) of cells 402 encompassing the region at (or above) the best bid 210 and at (or lower) than the best offer 206 are preferably visually distinguished from the cells containing the best bid 210 and the best offer 206. For example, the system may vary the text attributes, border and/or background of the cells in this intermediate region to allow a user to quickly distinguish them from the cells containing the bids and offers that are not in these rows. Two division lines 400 can be provided to further delineate the row(s) of cells 402 encompassing the region between the best bid 210 and best offer 206.

Figure 5:
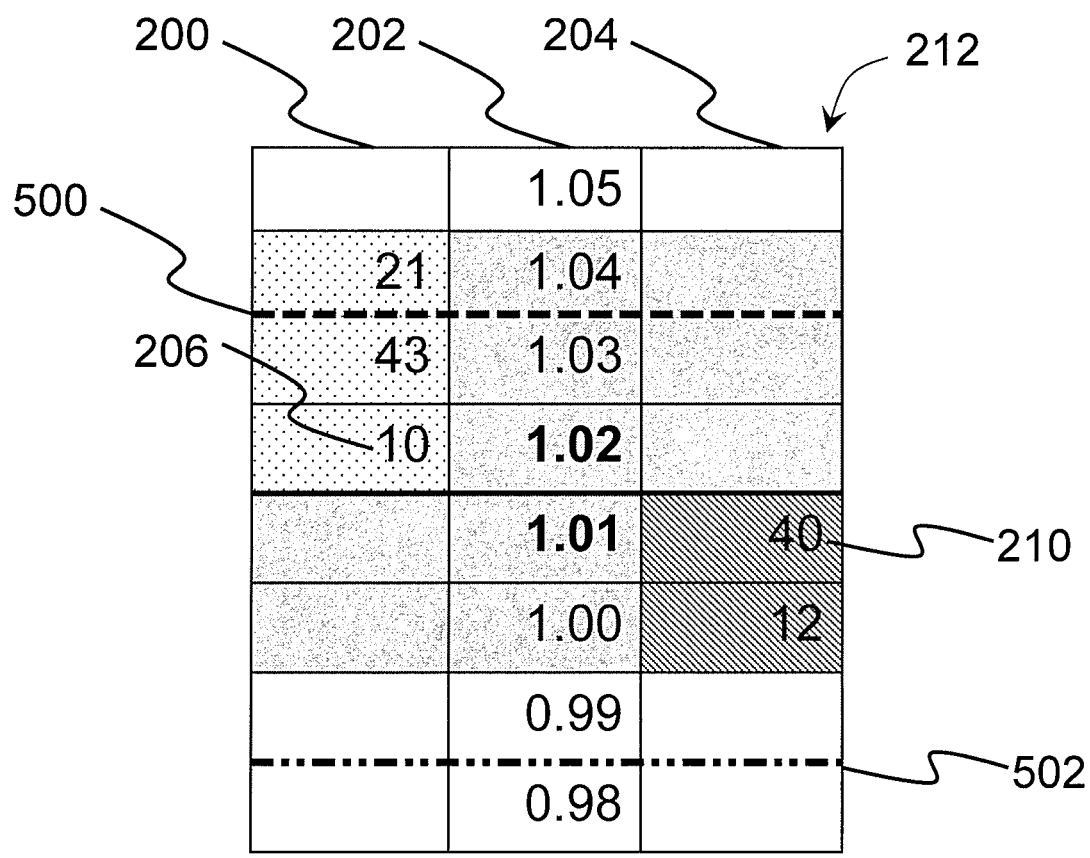

FIG. 5 shows an embodiment of the invention in which the maximum and minimum bid and ask prices at which a trade was executed for a particular timeframe are computed by the system and the dynamic price ladder 212 is displayed with the maximum and minimum bid and ask prices shown for the timeframe by indicators on the dynamic price ladder. In the embodiment shown, the high bid is indicated with a dashed bounding line 500 above the corresponding price level row. Alternatively, this bounding line could be color coded or otherwise configured to differentiate the highest level reached in a particular timeframe. Also in this embodiment, the low ask price level at which a trade was executed is indicated by a dotted and dashed bounding line 502 below the corresponding price level row. Alternatively, this bounding line could be color coded or otherwise configured to differentiate the lowest price level at which a trade was executed reached in the particular timeframe.

Figure 6:
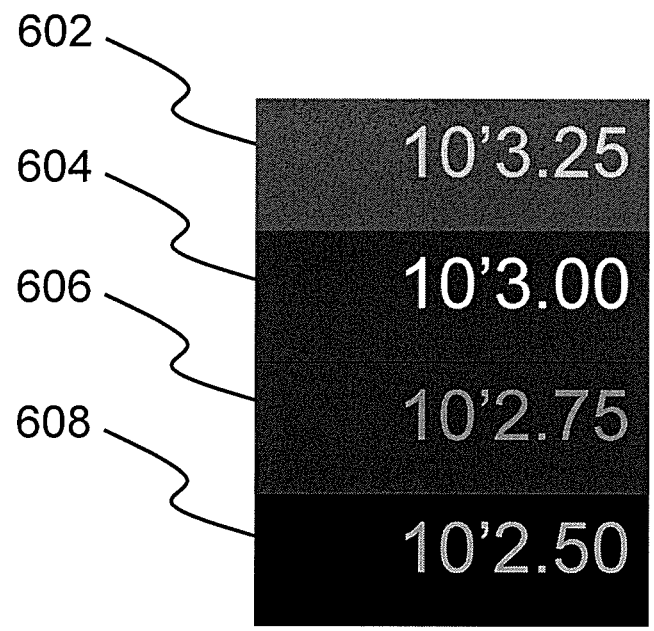

FIG. 6 shows how various price levels and quantities may be represented in the system by varying text attributes and background color or fill in order to enable the user to determine the importance of a price level at a glance. Possible renderings include: a price level between the best bid and offer 602, the best bid/offer price level 604, Price level with volume 606, and price level without volume 608. These display features or mechanisms can be incorporated into the dynamic price ladder by the system along with other shading and color mechanisms which make it easier for a user to determine the status of the market and their particular bids and offers.

According to an embodiment of the invention, an interactive feature is included to prevent an error that may occur when a user is attempting to click on a cell in the grid when the market moves at the instant the user is clicking. This is achieved with a so-called "Sticky Cells" feature or mechanism.

The Sticky Cells mechanism is based on the premise of cell "tagging." Tagging a cell means that all keyboard and mouse input will go to that cell, regardless of whether the pointer is currently above it or not. The client application or system is configured so that a cell on the table is tagged when the mouse spends a configurable amount of time (in milliseconds) hovering above the cell. When the mouse pointer moves, the tag is re-set to the cell that pointer is over. While the mouse pointer is not being moved, or is moved to a location without taggable cells, the tag remains stuck to the cell even if the market moves causing the display to adjust, thus moving the cell in question up or down the ladder.

The sticky cells effect is preferably configurable so that the user can choose which columns to use it in, and the amount of time it takes to tag a cell when the mouse is moving or hovering above it. Preferably, when a cell is tagged, the system displays an indicator that identifies the tagged cell to the user.

FIGS. 7-10 illustrate an example of how the Sticky Cells feature functions according to one or more embodiments of the present invention.

Figure 7:
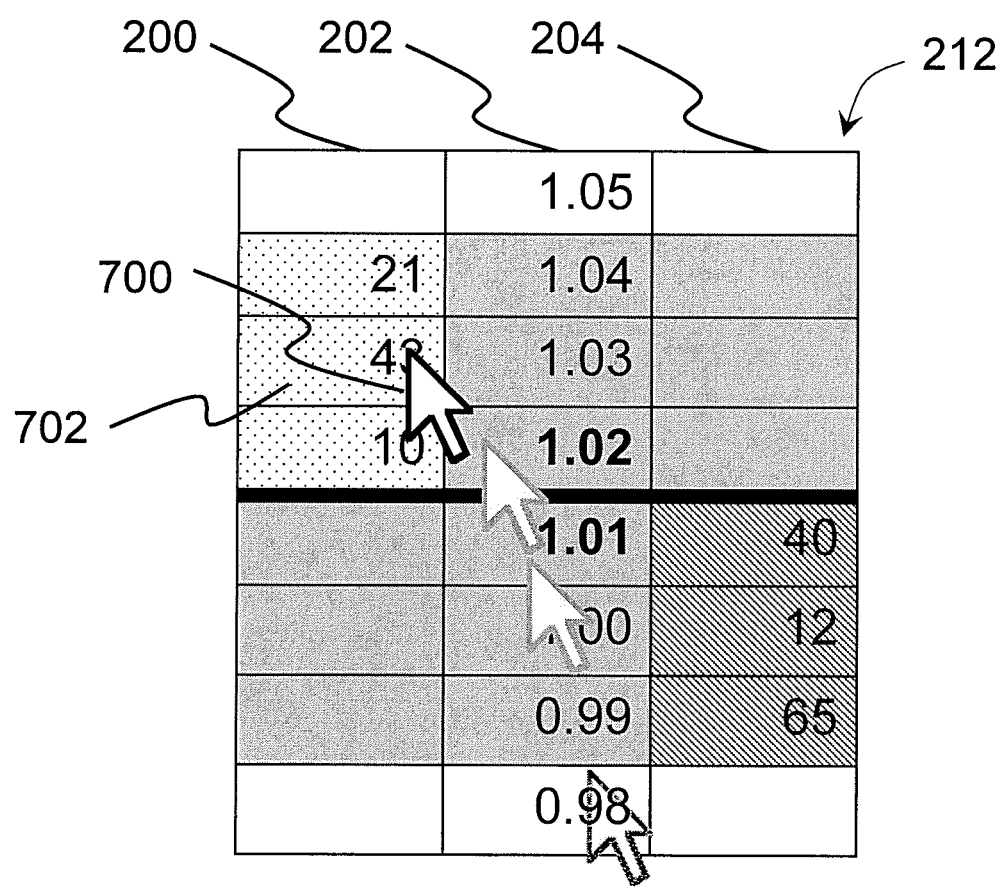
FIGS. 7-10 show representative portions of a graphical user interface for a computer display illustrating a sticky cells feature according to an embodiment of the present invention.
Figure 8:
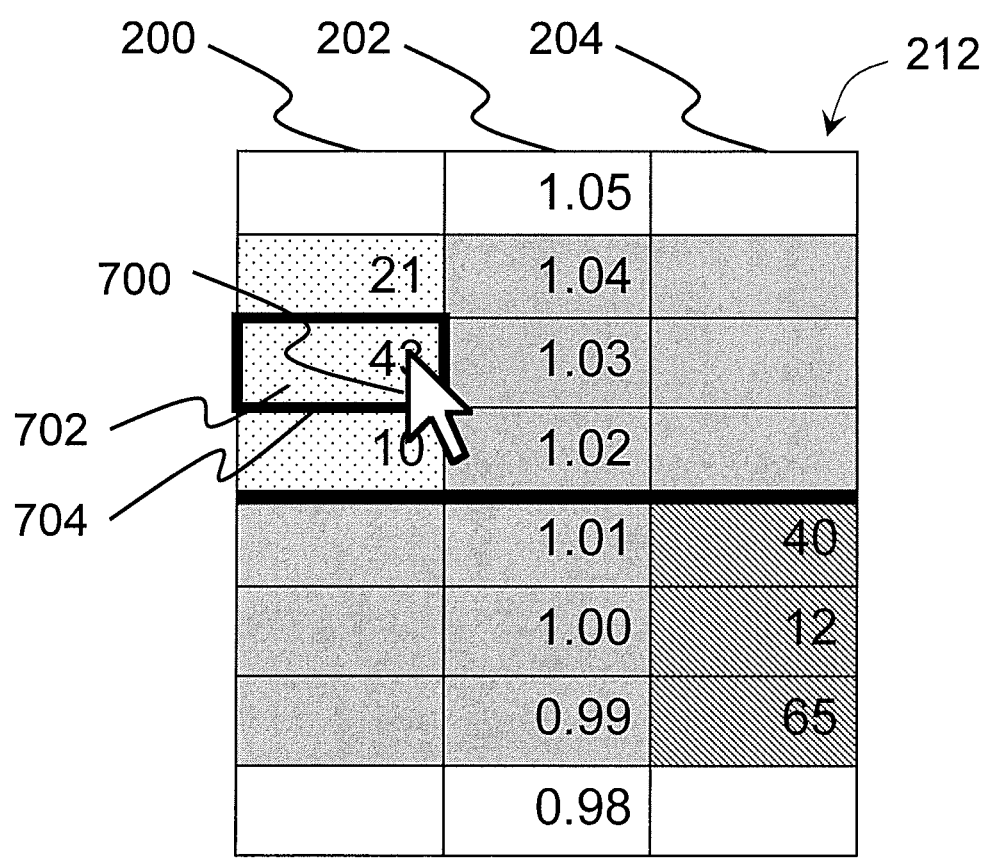

FIG. 7 illustrates the mouse pointer or cursor 700 on a user's display being moved to table cell 702 containing an offer of 43 at 1.03. In an embodiment, the cursor 700 is caused to move by the system in response to operation by the user of a user interface device such as a mouse or keyboard. In FIG. 8, when the cursor 700 moves through, or hovers over table cell 702 containing the offer of 43 at 1.03 for the preconfigured amount of time, the display system or interface is configured so that the cell is "tagged," which is indicated by the thick cell border 704. In addition to or instead of increasing thickness, the cell border 704 might also be highlighted by changing to a particular color, pattern, or displaying an animation, such as a flashing border or background. Alternatively, the system may change a text attribute and/or background of the cell to indicate that the cell has been tagged.

Figure 9:
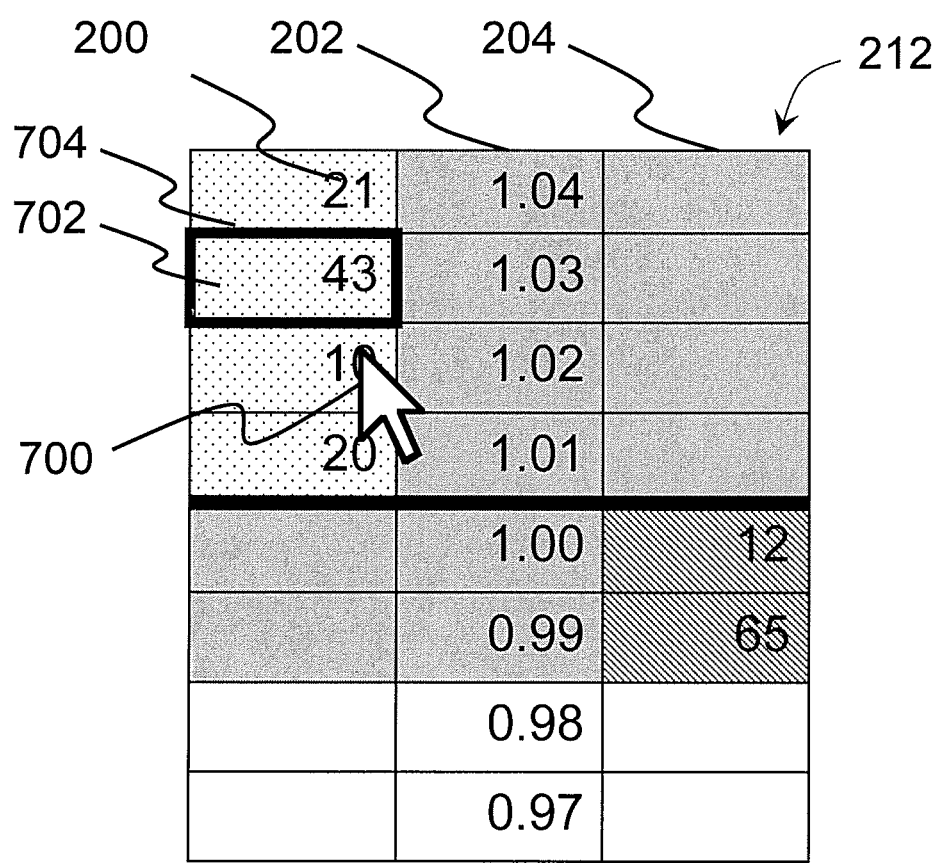

FIG. 9 illustrates that when the market moves by one price tick down, the display is adjusted accordingly. Until the tag is reset, the table cell 702 containing the offer of 43 at 1.03 remains "tagged," as indicated by the thick cell border 704. More specifically, as price levels shift up and down in relation to the best bid or offer indicator 208, which preferably remains centered, the tagged cell indicator 704 moves with the price levels. Accordingly, if the cursor 700 remains stationary as the market data moves, it may reside over or point to a cell other than the tagged cell.

Figure 10:
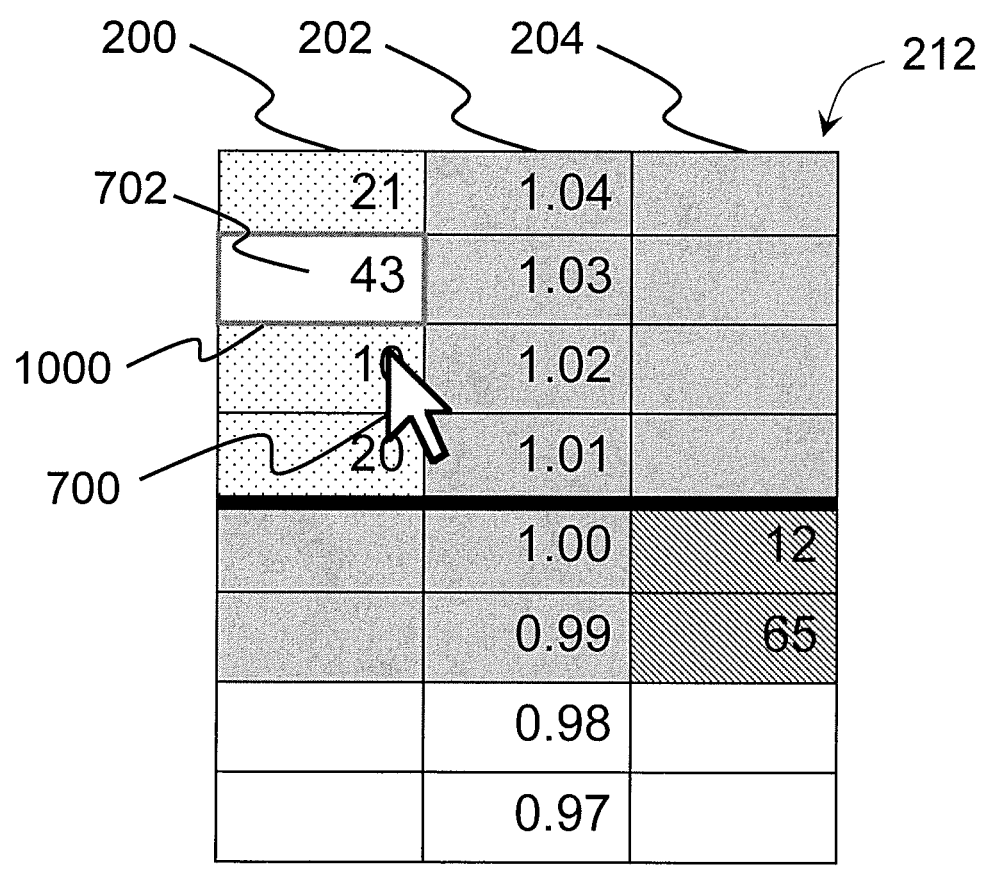

In FIG. 10, the user makes a selection with the user input device (e.g., by clicking a mouse button) but the selection registers in the "tagged" cell 702, rather than the cell which the cursor 700 is over at the time the selection is made. The cell that registers the click is now indicated by the system, e.g., by changing the background or border 1000 or by means of some other visual signal indicating that the user's selection has been applied to that cell.

Programmatically, the display system or application can include objects, components, or modules for tagging a cell and maintaining it as the active location even as data moves on the screen. One skilled in the art will understand that, depending upon the language selected for creating the client display system or application, a number of techniques could be used to effect the Sticky Cells function.

According to an embodiment of the present invention, features can be provided that present the data in such a way that the user can quickly discern market flow based on various coloring and shading schemes. This market flow indication allows a trader to get a sense of the direction of market flow.

Figure 11:
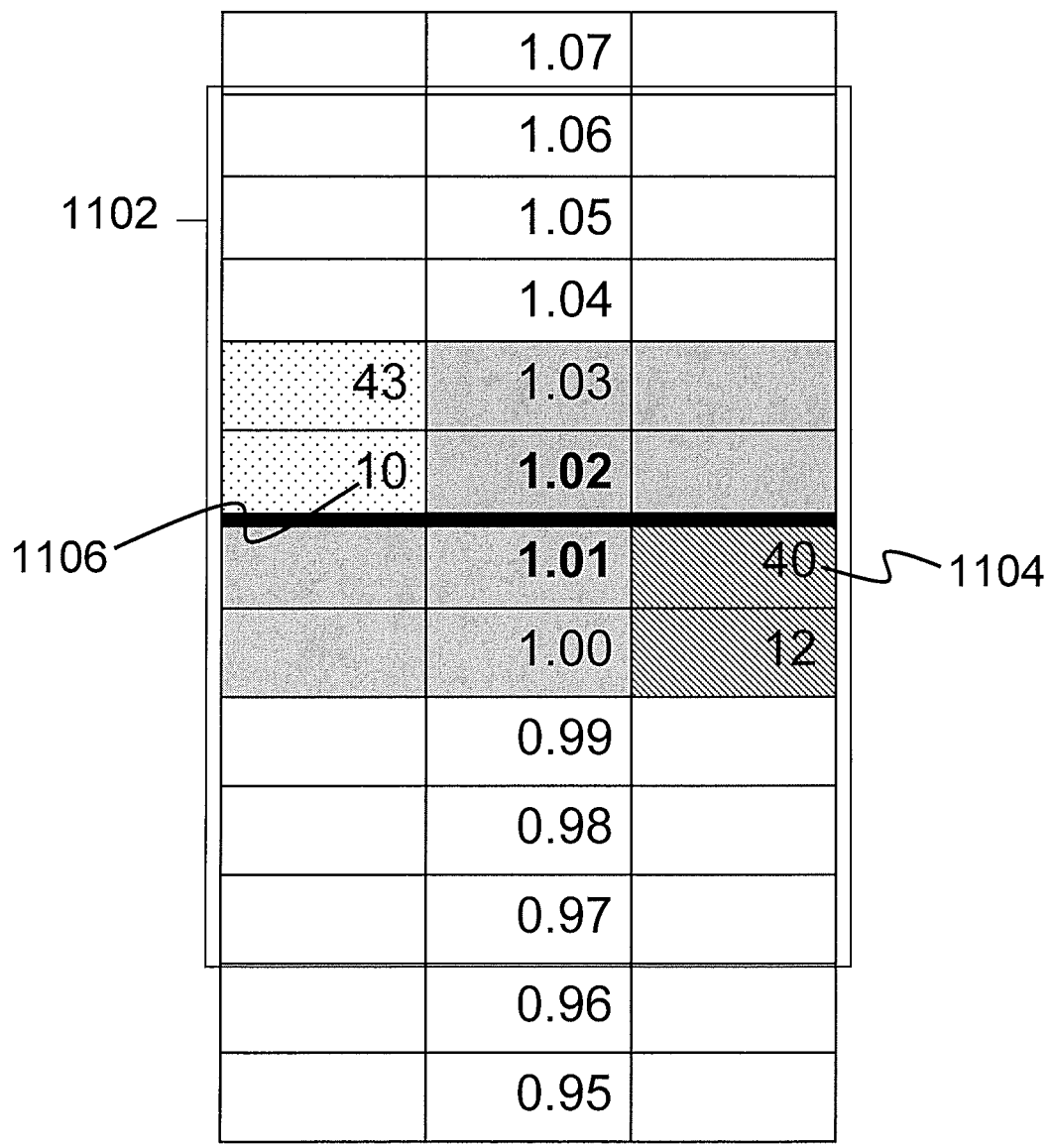
FIGS. 11-13 show representative portions of a graphical user interface for a computer display illustrating a market flow indication according to an embodiment of the present invention.

FIG. 11 shows an initial state of the dynamic price ladder according to an embodiment of the present invention. As shown, price levels are displayed in a viewport 1102, which is centered on the current best bid 1104 and best offer 1106. When the market moves, the viewport 1102 readjusts so as to keep the best prices at the vertical center. All price levels are displayable, regardless of whether there is any volume at the price.

In an embodiment, by pressing and holding down the Shift key, the user can scroll the viewport 1102 up or down by using the mouse wheel. When the Shift key is released, the viewport 1102 returns to the centered position. While the viewport 1102 is scrolled away, the user can still interact with the grid and the viewport 1102 doesn't readjust on market move.

In a preferred embodiment, when data flow visualized through the price ladder is interrupted, the view freezes, ceases being interactive, and is "grayed" over or otherwise modified to indicate that the prices are not live anymore.

According to an embodiment of the invention, when looking at the viewport 1102 centered at the current bests in a price ladder, the trader sometimes needs an indication of the direction of market flow in comparison to some previous point in time. That is, a trader desires to visually understand the movement of the market during the trading day. The present invention achieves this with market highlighting features or indicators.

Figure 12:
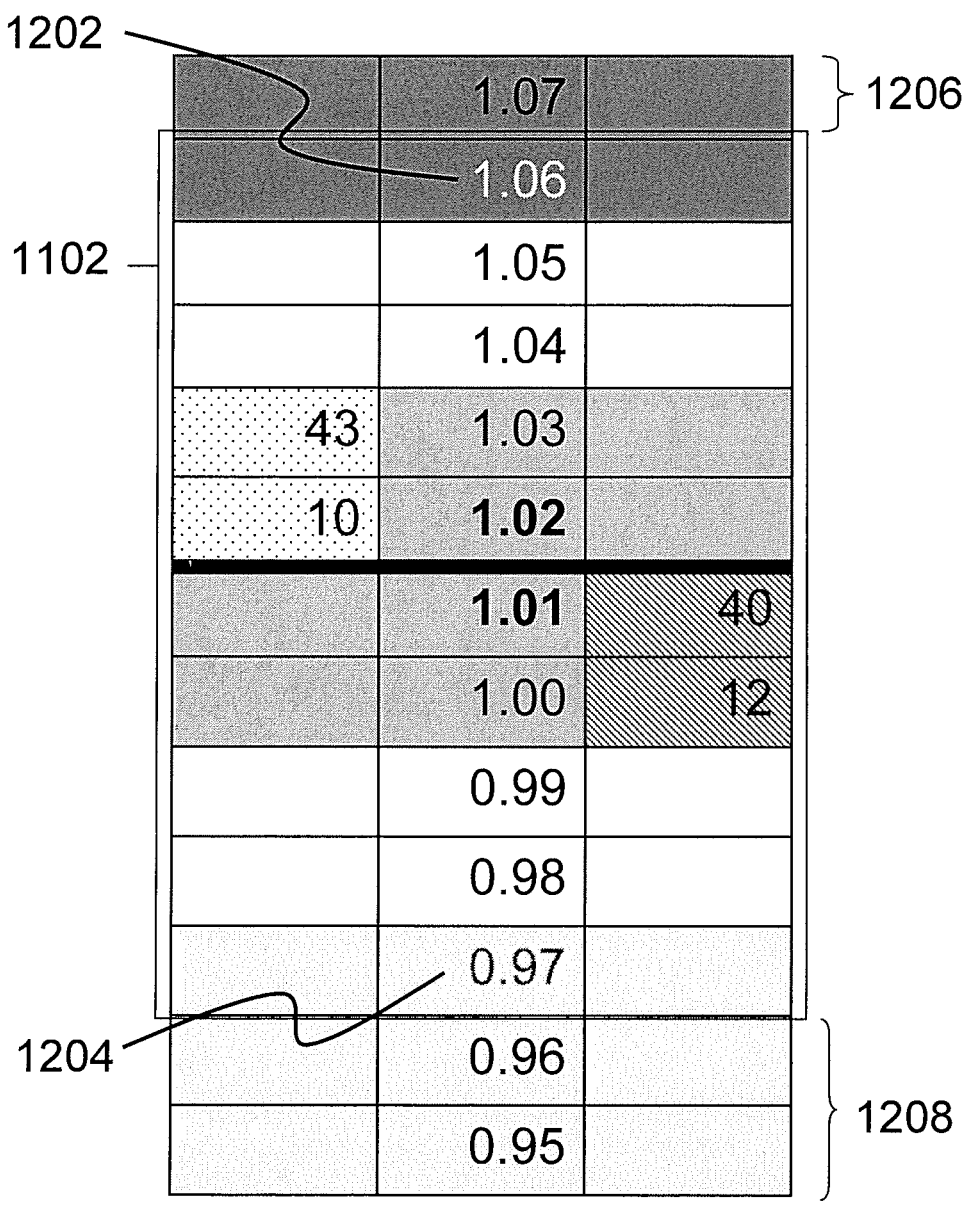

FIG. 12 shows the display after the user provides a particular input (e.g., a middle mouse click) on the price ladder or elsewhere on the display to initiate the market highlighting features or indicators. In this view, the topmost price level 1202 and the bottommost price level 1204 visible in the current viewport 1102 are highlighted by varying text attributes, background and/or borders. For example, the topmost price 1200 can be indicated by highlighting in bright green and the bottom most price 1202 can be indicated by be highlighting in red. In an embodiment, the background color of price level rows outside the current viewport 1206 becomes dark green for above and dark red for below 1208. This indicates and marks the current market position.

Figure 13:
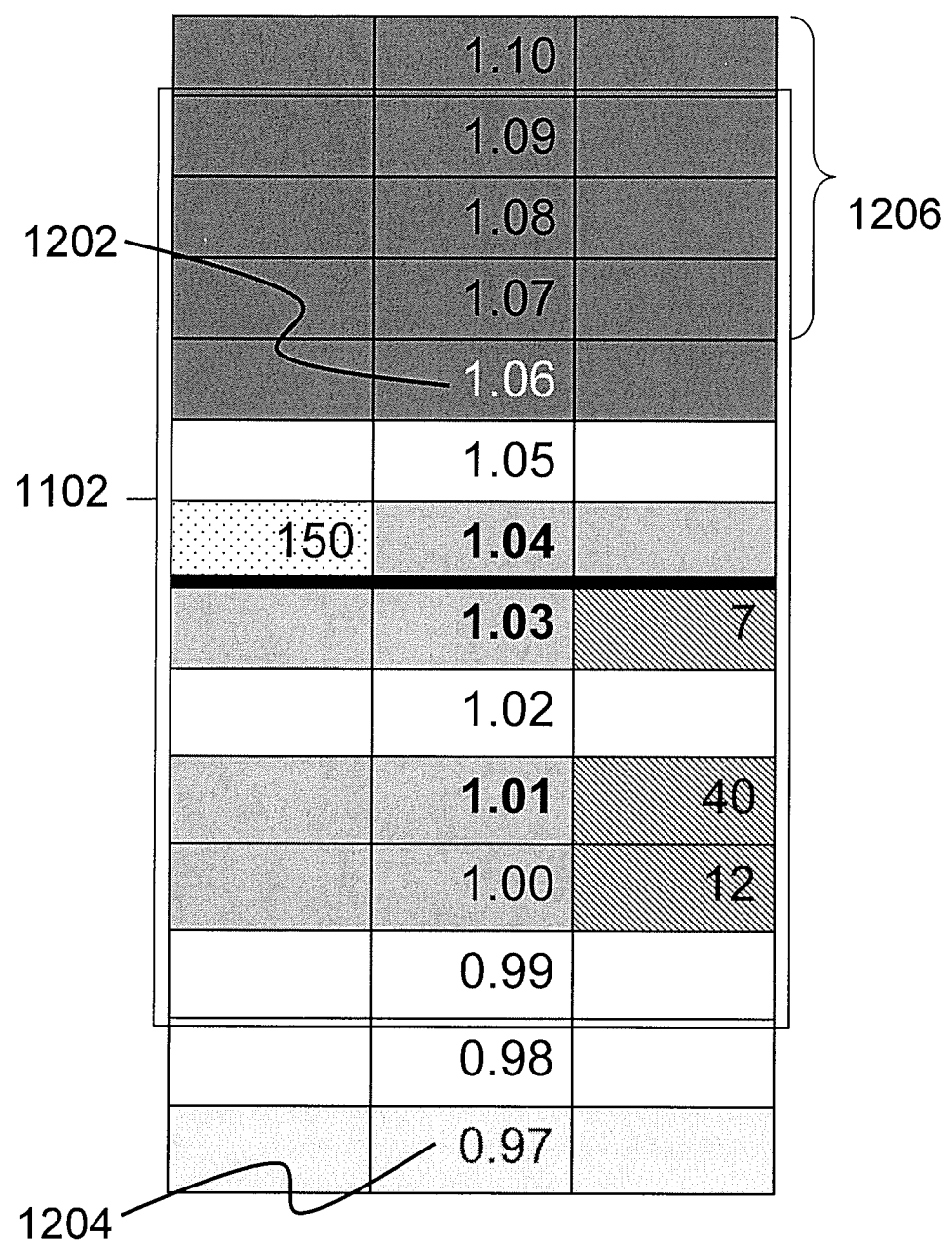

FIG. 13 shows the display after the market has moved up by 0.02. As the market moves up or down, the previously marked topmost price level 1202 and the bottommost price level 1204 remain highlighted, and depending on the direction of the market movement, the rows that were outside of the viewport at the time of the middle mouse click now become visible.

As the market is moving up, rows indicated by dark green background color 1206 move into the viewport. As the market is moving down, rows with dark red background 1208 (as shown in FIG. 12) move into the viewport. These indicators allow the trader to quickly and easily discern the direction and the extent of the market movement since the time he/she marked the market position.

The dynamic price ladder can be configured to display the trader's orders at their corresponding price levels. However, this also means that the order information will follow the movement of its corresponding price level as the market moves, thus making it difficult for the trader to view and manipulate their orders.

Figure 14:
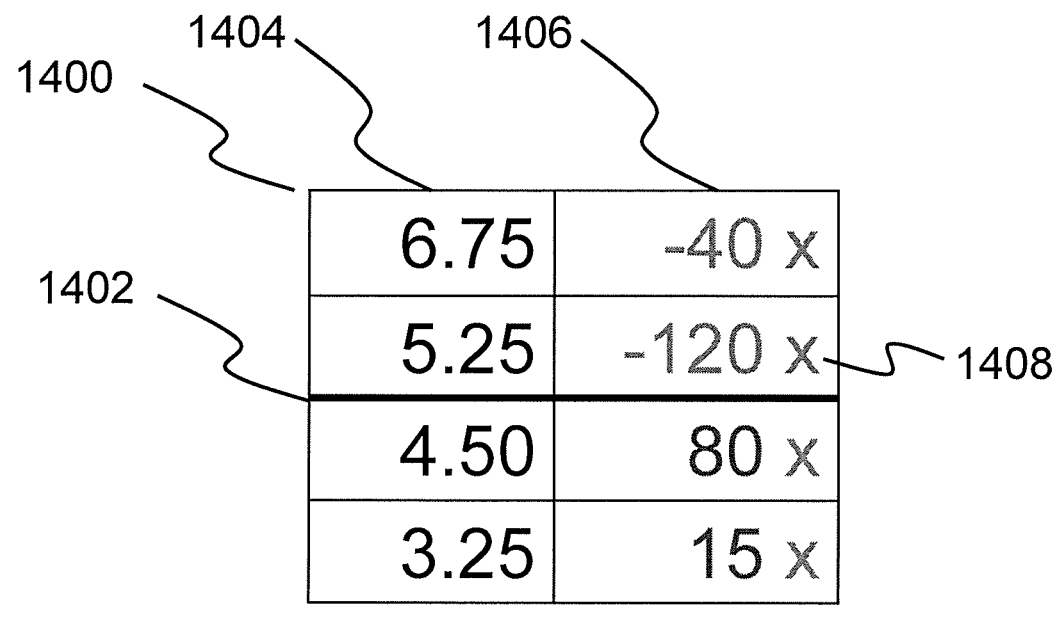
Figure 15:
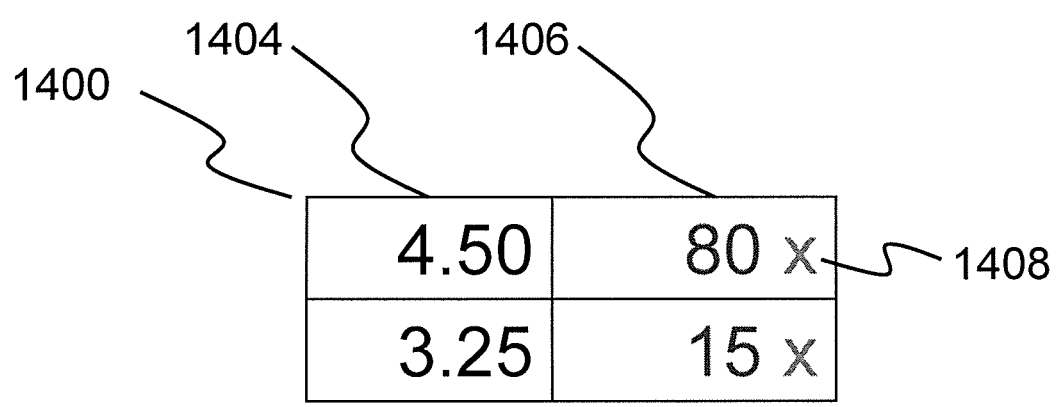

According to an embodiment of the invention as shown in FIG. 14, a static working orders grid 1400 is displayed on the workstation to provide the trader with an overview of his open orders for the tradeable object viewed. The grid 1400 is preferably configured to allow the trader to cancel orders directly. In the static working orders grid 1400, orders are preferably presented as a vertically stacked table with each row corresponding to an order price. In an embodiment, the grid 1400 includes, at least, columns for price 1404 and buy/sell order size 1406 and is sorted by price, with the highest on top. Buy and sell orders are preferably separated by a splitter line 1402 at the vertical center of the grid. If only buy or sell orders exist, then the splitter line is preferably not shown and all orders are displayed as a vertically centered group, e.g., as in FIG. 15. The system is preferably configured so that when a user selects an order using a user input device (e.g., by left mouse clicking on an order volume), the order can be cancelled. The system can provide an indication that an order is cancelable, e.g., by displaying a small red "x" 1408 to the right of the order volume.

Figure 16:
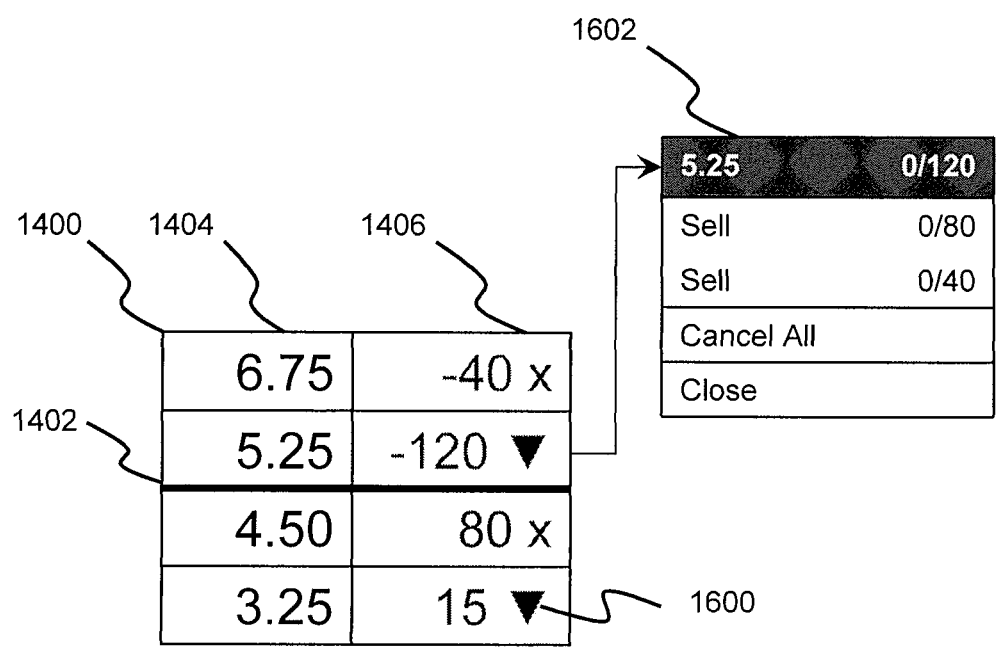

FIG. 16 shows an embodiment in which multiple orders at the same price are aggregated into a single row. If there are multiple orders in the row, then the cancel indicator ("x") is replaced with the down-arrow symbol 1600 that indicates that selecting the order (e.g, by left-clicking) will display a drop-down menu 1602 for selecting which of the aggregated orders to cancel.

The system can be configured such that right clicking on a multiple-order cell with a mouse will cancel all aggregate orders without the need for a drop-down menu. In an embodiment, the table can be scrolled up or down with the use of the mouse wheel or some other input device. In an embodiment, clicking on the Price column header re-centers the table on the buy/sell splitter. In an embodiment, if data flow visualized through this order grid is interrupted, the view freezes, stops being interactive and is altered by the system, e.g., "grayed" over to indicate that the order status is not up-to-date.

The Assignee of the present invention owns and operates an exemplary futures trading offering known as ITG MATRIX, which allows a trader to efficiently execute and manage trades across multiple asset classes with the confidence and anonymity that innovative technology, experience, and broker-neutrality provide. The trading system includes sophisticated tools for electronic execution and risk management; traders can access individual markets or trade multiple asset classes side-by-side. One-click trading capabilities promote efficiency and high-speed routers and algorithms maximize opportunities for best execution. Alternatively, the market data and order entry APIs enable low latency direct market access from black-box or automated trading strategy. Either access method facilitates fast, anonymous, and reliable multi-asset trading. The trading system offers, among other things, features for consolidated equities, options, futures, fixed income, and foreign exchange trading, high-speed access to exchanges, ECNs, dark pools, and algorithms, streaming market data, position monitor and risk management tools, message monitor to track activity, and API access for black-box automated strategies. As should be understood by the skilled person in the art, aspects of the present invention, which are described in further detail below, may be implemented in a trading offering such as ITG MATRIX.

Figure 17:
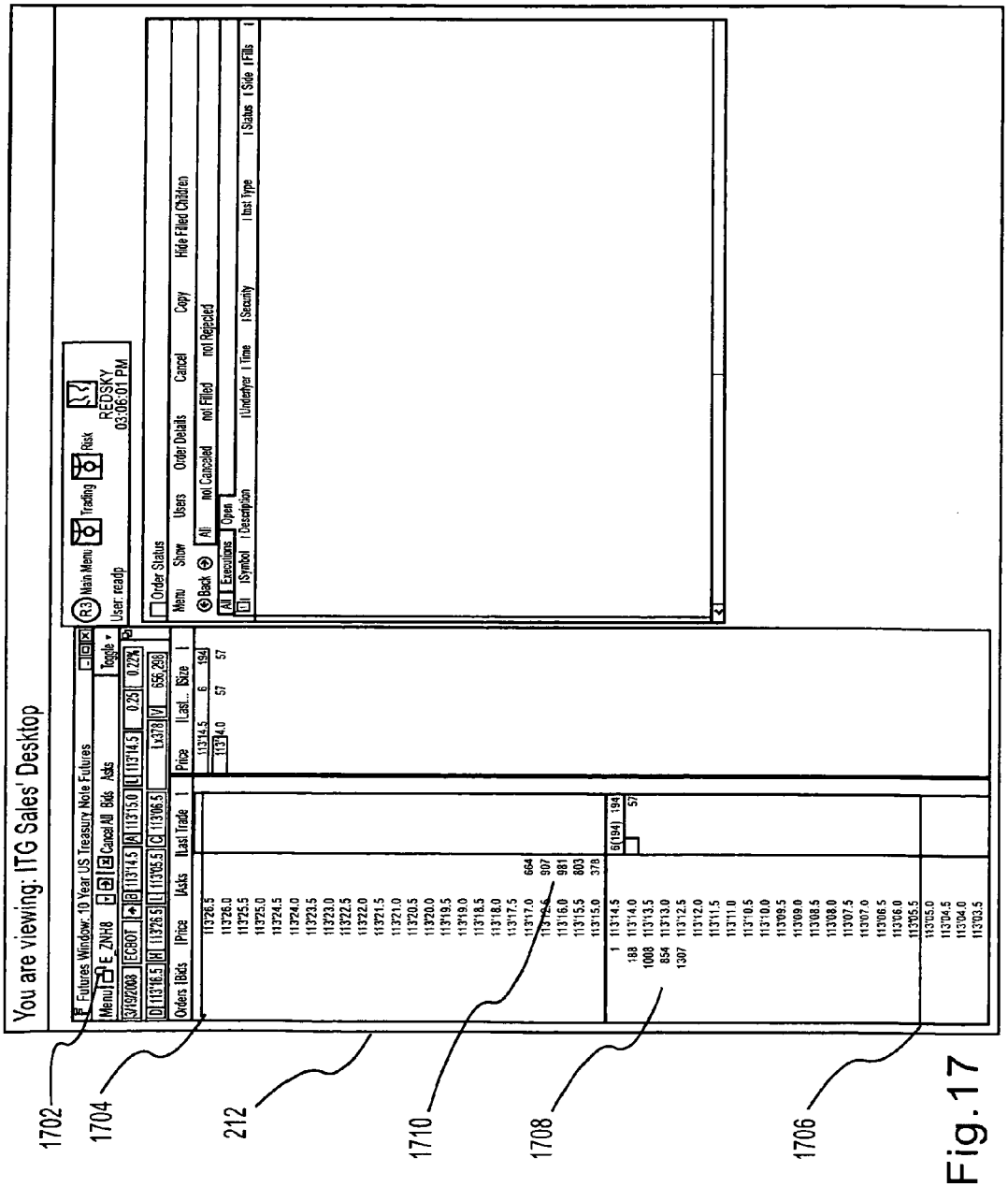
FIGS. 17, 18a, 19, and 20 are screen shots of an exemplary client interface according to an embodiment of the present invention.

FIG. 17 is a screenshot from ITG MATRIX showing various features described above incorporated into the user interface of a trading application. In addition to the dynamic price ladder 212, several other controls and views are shown. The particular tradeable asset being viewed in the dynamic price ladder and related screens is selected via a drop down control 1702. A green line 1704 is used to indicate the maximum ask price for the day and a red line 1706 is used to indicate the minimum bid price for the day.

Figure 18A:
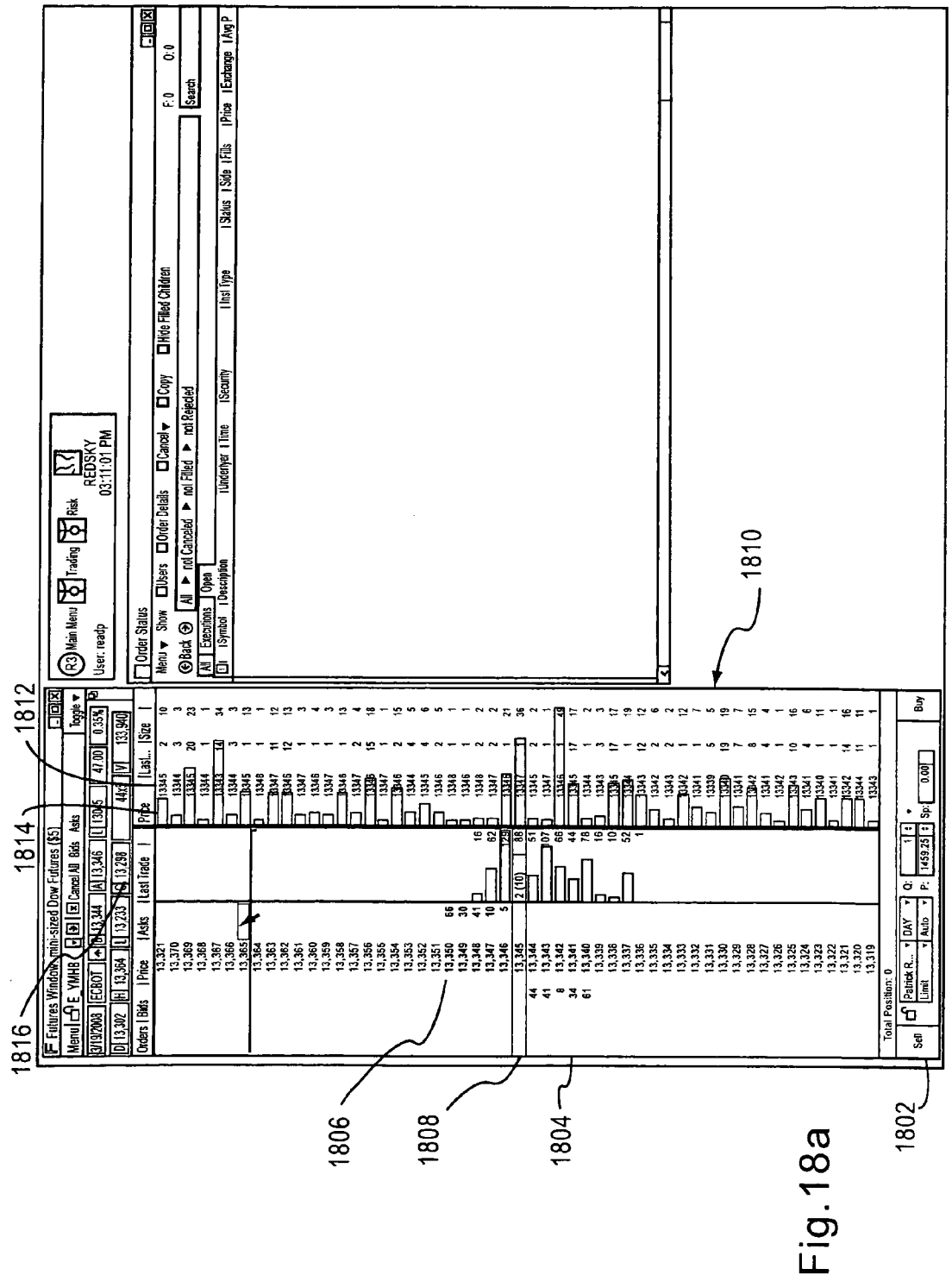

Another feature which allows a trader to more easily discern the state of the market is the shading of the background of cells. In the example shown, cells containing bid prices 1708 have a background shade of blue. Cells containing ask prices 1710 have a background shade of red or burgundy. The shading of various cell backgrounds based on the type of information they contain can be done with a variety of different colors and patterns, and can also be configurable to allow a user to select the shading or other attributes according to their personal preference FIG. 18a is a screenshot of an embodiment of the present invention showing various features described above incorporated into the user interface of a trading application. In this screenshot, an order entry pane 1802 is shown. The order entry pane 1802 allows a user to enter the criteria for an order they would like to place. Controls are provided within the order entry pane 1802 allowing the user to select the quantity and price and whether they would like to buy or sell the particular tradeable asset. Additional controls are provided which allow a user to enter optional settings, such as the time for which the order should be in force (e.g., the day) and whether or not the order is a limit order. In an embodiment, the fields in the order entry pane can be automatically populated by selecting a price level for an object on the price ladder. This feature is particularly useful when combined with the sticky cell feature described above.

In the example shown, there are one or more price levels of the object the user is interested in transacting between the best bid 1804 and best offer 1806. The row(s) of cells 1808 encompassing the region between the best bid 1804 and best offer 1806 are shaded with a different color or pattern than the cells above and below this level.

A price quantity distribution pane 1810 shows a histogram of the price and quantity of any trades made during the time since the window was opened. In association with the dynamic price ladder, the price quantity distribution pane 1810 serves as a quick visual indicator of the trading history around the current market bid and asks, and it may be used to illustrate a trend, such as increasing and decreasing volume, or rate of change in volume, or increasing or decreasing price, etc. Beginning at the top of the histogram graph, a bar graph is displayed. The last traded price 1812 overlays a quantity bar 1814.

The price quantity distribution pane 1810 is displayed in reverse chronological order (i.e., the most recent trades are at the top of the table.) The quantity bar 1814 provides a visual indication of the size of the trade. For example, a trade with a greater number of shares will have a longer quantity bar 1814 than a trade with a lesser number of shares. Furthermore, each shaded bar 1814 is colored according to whether that trade was executed above or below the "spread." In futures trading, the spread is defined as the range of prices encompassing the five best bids and five best asks at a particular point in time. The shaded bar 1814 is shaded green if the trade was executed above the spread and red if the trade was executed below the spread. The last traded quantity column 1816 shows the overall quantity traded for each price level for a particular period of time.

Figure 18B:
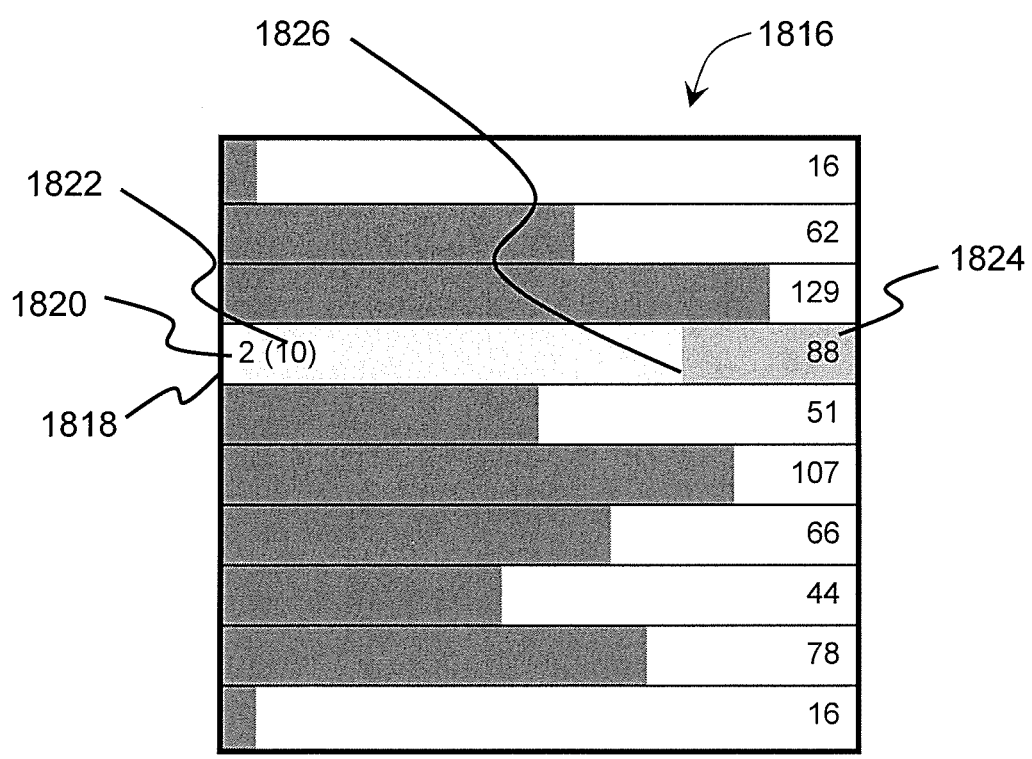

FIG. 18b shows a closeup of a portion of the last traded quantity column 1816. A highlighted cell 1818 corresponds to the price level for the most recent trade in the market. Information regarding the current state of the market may be shown by highlighting the cell in last traded quantity column 1816 corresponding to the last traded price at which a trade was executed in the market. The highlighted cell 1818 of the last traded quantity column 1816 features current quantity 1820 as the first number displayed, the cumulative quantity 1822 in parentheses and the overall quantity 1824 on the right. As an example, the current quantity can represent the quantity of the most recent trade, the cumulative quantity can represent the quantity traded since the user opened the application, and the overall quantity can represent the quantity traded for the day. A volume bar 1826 gives a visual indication of the overall quantity 1820 that has been traded at each price level. Furthermore, the background highlighting and volume bar 1826 within the highlighted cell is colored according whether the last price ticks up, down or no change. The background color of the highlighted cell 1818 can be shaded in a particular color, such as yellow, and may remain that color until a quantity of a different price level is filled. The highlighted cell 1818 can be shaded green or red depending on whether an up or down tick comes in.

Figure 19:
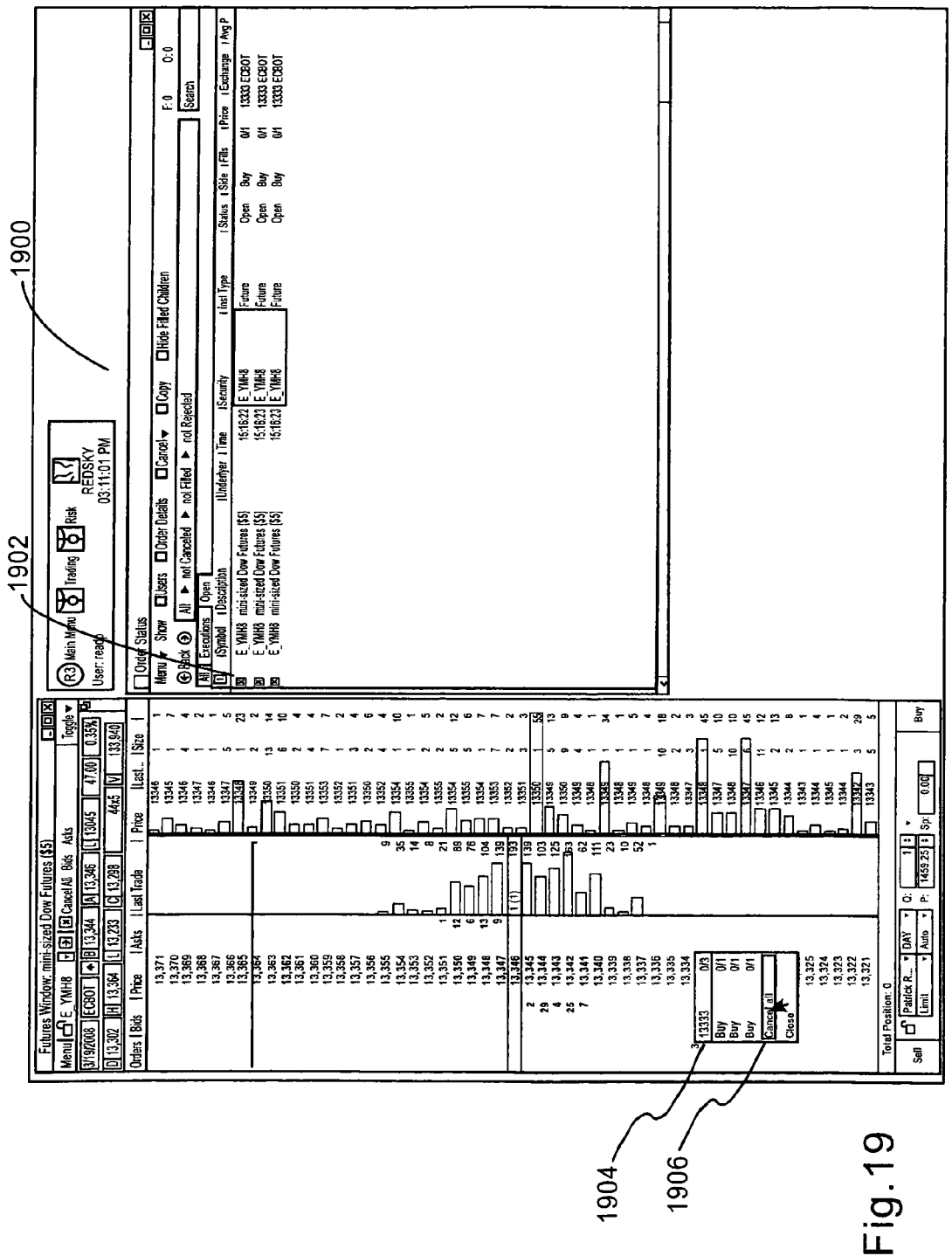

FIG. 19 is a screenshot of an embodiment of the present invention showing various features described above incorporated into the user interface of a trading application. A static working orders grid 1900 allows the trader to have an overview of his open orders for the market instrument he/she is viewing, as well as to cancel them directly. Each table row includes a small, clickable, red "x" 1902 indicating that the order is cancelable. A user's orders are also displayed in the dynamic price ladder where the user's order(s) 1904 are shown in a different colored text than market order. The total number of shares shown in the dynamic price ladder can be either for a single order or the aggregate of multiple orders placed at that price level. In an embodiment, selecting a cell (e.g., by mouse clicking) in the dynamic price ladder corresponding to a user's order will result in a menu 1906 being displayed. The menu 1906 gives the user the option to cancel all or some of the orders which make up the aggregated total of all orders at the selected price level.

Figure 20:
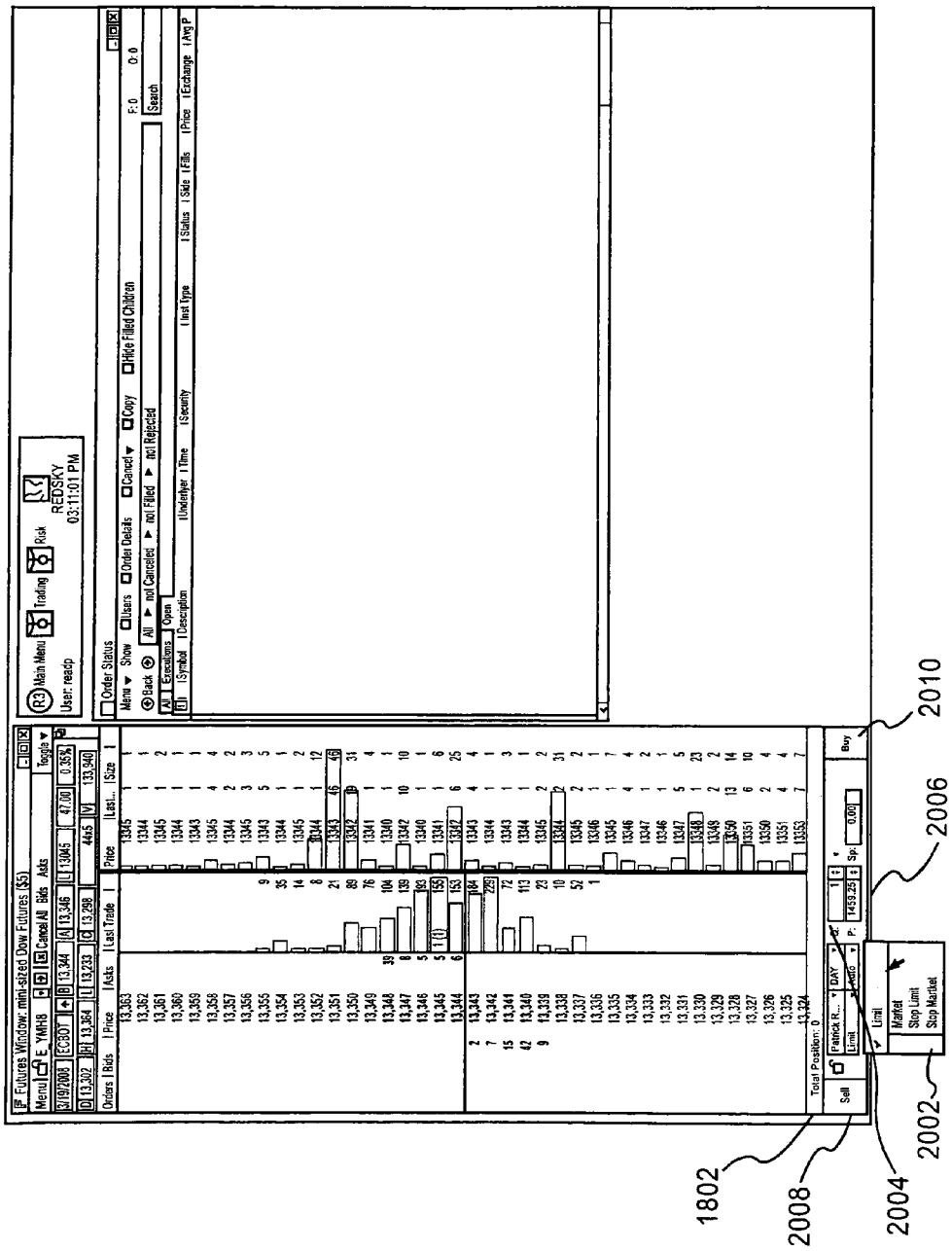

FIG. 20 is a screenshot of an embodiment of the present invention showing various features described above incorporated into the user interface of a trading application. In this screenshot, the order entry pane 1802 is shown. An order type dropdown box 2002 allows a user to select what type of order they are placing. Some possible options include: limit, market, stop limit, and stop market. A quantity selector 2004 allows a user to select the quantity for the order they are configuring and a price selector 2006 allows a user to set the particular price at which they wish to trade. A user can select the sell button 2008 to place an order to sell the tradeable asset which they have specified or click the buy button 2010 to place an order to buy the tradeable asset which they have specified.

Figure 21:
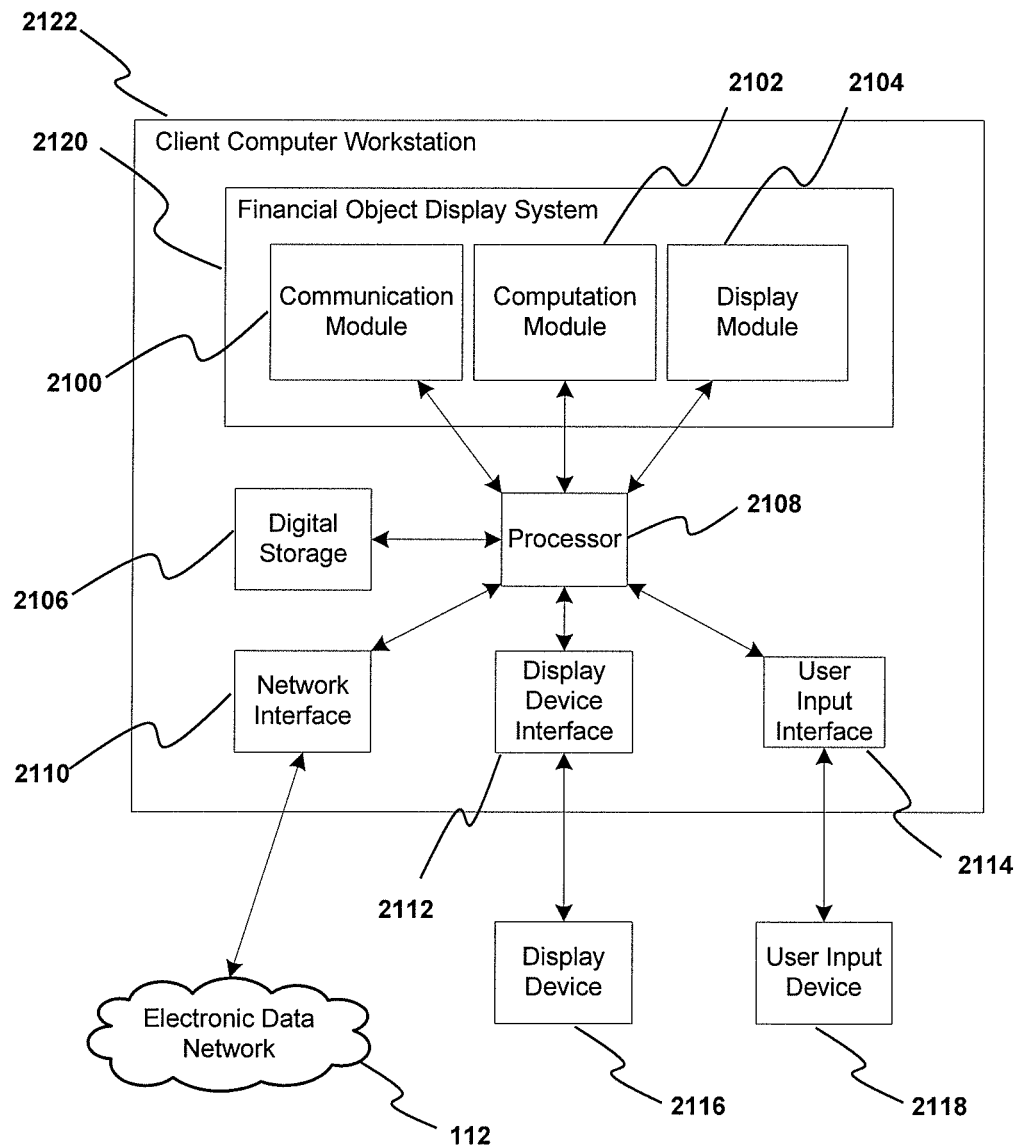
FIG. 21 is a schematic diagram illustrating the components of a system according to an embodiment of the invention.

FIG. 21 shows a financial object display system according to an embodiment of the present invention. The dynamic price ladder is preferably generated by a financial object display system 2120 which is executed on or displayed by a client computer workstation 2122 having a display device 2116, such as a monitor and a user input device 2118, such as a mouse and/or keyboard. Client computer workstation 2122 can also include processor 2108 and digital storage 2106, which can be random access memory (RAM) or other temporary or persistent storage. Processor 2108 receives data from user input device 2118 via user input interface 2114. Processor 2108 transmits data to display device 2116 via display device interface 2112. Client computer workstation 2122 can include network interface 2110 which is configured to transmit and receive data over electronic data network 112. The financial object display system 2120 includes a communication module 2100, a computation module 2102, and a display module 2104.

The dynamic price ladder is preferably visually represented in a table having at least three columns. The data displayed in the cells which make up these columns includes the range of possible prices or price levels for the particular tradeable object, as well as quantities of open bids for the tradeable object according to price level and quantities of open offers for the tradeable object according to price level.

In an embodiment, the information and manner in which it is displayed on the financial object display system 2120 is generated by the display module 2104. The display module 2104 can generate the display using HTML or graphical controls designed for the particular operating environment in which the system has been implemented.

The data used by the system to populate the dynamic price ladder can be received from a number of different sources. Communication module 2100 is configured to transmit and receive data from one or more computers over an electronic communication network 112. These computers can include a market data feed, an exchange where particular types of tradeable assets are traded, an OMS, EMS, ATS or ECN. Other types of data sources could provide information for display as well. Depending on how the particular embodiment is implemented, the communication module 2100 may be executed on the same computer that is executing the financial object display system 2820 or it could be executed on an application or web server. Furthermore, data received from a user input device (e.g., a selection of a particular portion of the display by the user via a mouse) indicating user interaction with the user input device 2118 can be transmitted to the other systems connected to the electronic communication network 112 by the communication module 2100. For example, if a user makes a selection at the user input device 2118, e.g., by clicking on a particular cell using their mouse, indicating they would like to place a buy order at that particular price level, the communication module 2100 can be configured to send that information to the appropriate exchange.

Prior to the information being displayed by the financial object display system 2120, various computations can be performed by the system in order to determine particular information that is important to a user of the system. For example, the system may include a computation module 2102 configured to determine the best current bid and the best current offer based on the bid and offer data received from other computers via the communication module 2100. The computations made by the computation module 2102 can be used by the display module 2804 to provide various visual indicators that are displayed to the user to provide information such as the level between the best current bid and the best current offer.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. A computerized method of displaying data for trading objects in a financial market, said method comprising the steps of:

receiving on a first computer, via an electronic communication network, data from one or more other computers reflecting bid data and offer data for a tradeable object in a financial market;

generating on a display of the first computer a visual representation of a table with at least three columns within a window on the display, wherein:
  a first of said columns displays a plurality of possible price levels for the tradeable object,
  a second of said columns includes a plurality of cells representing quantities of open bids for the tradeable object at one or more of said price levels; and
  a third of said columns includes a plurality of cells representing quantities of open offers for the tradeable object at one or more of the said price levels;

displaying in the table on the first computer display the current bid data and offer data for the tradeable object and a first indicator indicative of a price level between the best current bid and the best current offer, wherein the first indicator is maintained at a predetermined spatial position within the window; and adjusting on the first computer display the position of the price levels on the table to maintain the first indicator at the predetermined spatial position in the window in response to receiving new bid data or offer data from the one or more other computers;

determining whether a length of time over which a cursor resided directly over a first cell in the table exceeds a predetermined amount of time, wherein the cursor is positioned on the first computer display based on input from a user input device in communication with the first computer;

updating the view of cells of the table on the first computer display to reflect new bid data and offer data from the one or more other computers, such that a second cell that is different than the first cell is displayed directly under the cursor;

receiving from the user input device data that represents a user selection while the second cell is displayed directly under the cursor; and in response to determining that the length of time over which the cursor resided directly over the first cell exceeds the predetermined amount of time, using the first cell to process the user selection, even when received while a different cell is displayed directly under the cursor.

2. The computerized method of claim 1, wherein the first indicator is a line between the best current bid and the best current offer.

3. The computerized method of claim 1, wherein the first indicator includes a first line under the best current offer and a second line above the best current bid.

4. The computerized method of claim 3, wherein said step of displaying current bid and offer data includes at least one of varying the text attributes and varying one or more background colors of the data between the first and second lines.

5. The computerized method of claim 1, further comprising the step of determining on the first computer the maximum and minimum daily prices at which the tradeable object has been traded based on bid and offer data from the one or more other computers, and displaying a second indicator including at least one of a first line below the maximum daily price and a second line above the minimum daily price.

6. The computerized method of claim 5, wherein the second indicator includes the first and second lines.

7. The computerized method of claim 6, wherein the first line is displayed using a first color and the second line is displayed using a second color that is visually distinguishable from the first color.

8. The computerized method of claim 1, wherein the plurality of possible price levels for the tradeable object comprise a contiguous subset of all possible price levels.

9. The computerized method of claim 1, wherein the predetermined spatial position of the first indicator is at a vertically centered position within the window.

10. The computerized method of claim 1, further comprising the step of providing on the first computer a scrolling option which, when invoked, allows a user to scroll up or down on the visual representation of the table.

11. The computerized method of claim 10, further comprising the step of returning the view of the table to the predetermined spatial position such that the first indicator is displayed at the predetermined spatial position in response to determining that the scrolling option is no longer invoked.

12. The computerized method of claim 1, further comprising:

displaying a second indicator, wherein displaying the second indicator includes displaying price levels above the best offer using at least one of a first text attribute and a first background color and displaying price levels below the best bid using at least one of a second text attribute and a second background color, wherein the first text attribute is visually distinguishable from the second text attribute.

13. The computerized method of claim 12, wherein said step of displaying a second indicator includes linking the second indicator to the price levels above and below the best offer and bid at a point in time and moving the second indicator with the price levels as the best bid and offer data change over time.

14. The computerized method of claim 1, further comprising displaying a second indicator, wherein said step of displaying a second indicator includes:

varying at least one of text attributes and background color of the first cell in response to determining that the length of time calculated exceeds a predetermined amount of time.

15. The computerized method of claim 1, wherein said step of displaying current bid and offer data includes at least one of varying the text attributes and varying one or more background colors of the data at respective price levels to distinguish between the best bid and offer price levels, price levels between the best bid and offer, price levels with volume, and price levels without volume.

16. The computerized method of claim 1, further comprising the step of displaying on the first computer a chronological list of executed orders for the tradeable object.

17. The computerized method of claim 16, wherein said displaying step includes varying at least one of a text attribute and a background color of respective executed orders based on whether the orders are above, below or between the best bid and the best offer.

18. The computerized method of claim 1, further comprising the step of transmitting a request from the first computer to the one or more other computers, over an electronic communication network, for bid and offer data on a tradeable object in a financial market.

19. The method of claim 1, wherein said step of displaying current bid data and current offer data includes displaying a number of the best offers above the first indicator using a first color and displaying a number of the best bids below the first indicator using a second color that is visually distinguishable from the first color.

20. The method of claim 19, wherein the plurality of cells of the second column and of the third column are divided by a plurality of lines into rows, and wherein the first indicator is visually distinguishable from the plurality of lines.

21. The method of claim 20, further comprising displaying in the table on the first computer display a second indicator that identifies the best bid in a predetermined time frame and a third indicator that identifies the best offer in the predetermined time frame, wherein the second indicator and the third indicator are visually distinguishable from the plurality of lines.

22. A computer system for displaying and trading objects in a financial market, said system comprising:

at least one computer configured to transmit and receive data from one or more other computers over an electronic communication network, to receive data from a user input device, and to display data to a user on a display device; and wherein the computer stores program instructions executable to implement a financial object display system, wherein the financial object display system includes:

a communication module for receiving on said at least one computer, via the electronic communication network, data from one or more other computers reflecting bid data and offer data for a tradeable object in a financial market;

a computation module for determining on the first computer the best current bid and the best current offer based on the bid data and offer data from the one or more other computers; and a display module for:

generating on said display device a visual representation of a table with at least three columns within a window, wherein a first of said columns displays a plurality of possible price levels for the tradeable object, a second of said columns includes a plurality of cells representing quantities of open bids for the tradeable object at one or more of said price levels, and a third of said columns includes a plurality of cells representing quantities of open offers for the tradeable object at one or more of the price levels;

displaying in the table on the first computer display current bid data and offer data for the tradeable object and a first indicator indicative of a price level between the best current bid and the best current offer, wherein the first indicator is maintained at a predetermined spatial position within the window; and adjusting on the first computer display the position of the price levels on the table to maintain the first indicator at the predetermined spatial position in the window in response to receiving new bid data or offer data from the one or more other computers;

determining whether a length of time over which a cursor resided directly over a first cell in the table exceeds a predetermined amount of time, wherein the cursor is positioned on the first computer display based on input from a user input device in communication with the first computer;

updating the view of cells of the table on the first computer display to reflect new bid data and offer data from the one or more other computers, such that a second cell that is different than the first cell is displayed directly under the cursor;

receiving from the user input device data that represents a user selection while the second cell is displayed directly under the cursor; and in response to determining that the length of time over which the cursor resided directly over the first cell exceeds the predetermined amount of time, using the first cell to process the user selection, even when received while a different cell is displayed directly under the cursor.

23. The system of claim 22, wherein the first indicator includes a line between the best current bid and the best current offer.

24. The system of claim 22, wherein the first indicator includes a first line under the best current offer and a second line above the best current bid.

25. The system of claim 24, wherein said display module varies at least one of the text attributes and one or more background colors of the data between the first and second lines.

26. The system of claim 22, wherein said computation module determines the maximum and minimum daily prices at which the tradeable object has been traded based on bid and offer data from the one or more other computers, and displaying a second indicator that includes at least one of a first line below the maximum daily price and a second line above the minimum daily price.

27. The system of claim 24, wherein the second indicator includes the first and second lines.

28. The system of claim 27, wherein the first line is displayed by the display module using a first color and the second line is displayed by the display module using a second color that is visually distinguishable from the first color.

29. The system of claim 22, wherein the plurality of possible price levels for the tradeable object comprise a contiguous subset of all possible price levels.

30. The system of claim 22, wherein the predetermined spatial position of the first indicator is at a vertically centered position within the window.

31. The system of claim 22, further comprising the step of providing on the first computer a scrolling option which, when invoked, allows a user to scroll up or down on the visual representation of the table.

32. The system of claim 31, wherein said display module returns the view to the predetermined spatial position such that the first indicator is displayed at the predetermined spatial position in response to determining that the scrolling option is no longer invoked.

33. The system of claim 22, wherein said display module displays a second indicator, wherein displaying the second indicator comprises: displaying price levels above the best offer using at least one of a first text attribute and a first background color and displays price levels below the best bid using at least one of a second text attribute and a second background color, wherein the first text attribute is visually distinguishable from the second text attribute.

34. The system of claim 33, wherein said display module links the second indicator to the price levels above and below the best offer and bid at a point in time and moves the second indicator with the price levels as the best bid and offer data change over time.

35. The system of claim 22, wherein said display module is configured to:

vary at least one of text attributes and background color of the first cell in response to determining the length of time calculated exceeds a predetermined amount of time.

36. The system of claim 22, wherein said display module is configured to vary at least one of the text attributes and one or more background colors of the data at respective price levels to distinguish between the best bid and offer price levels, price levels between the best bid and offer, price levels with volume, and price levels without volume.

37. The system of claim 22, wherein said display module is further configured to display on the first computer a chronological list of executed orders for the tradeable object.

38. The system of claim 37, wherein said display module is further configured to vary at least one of a text attribute and a background color of respective executed orders based on whether the orders are above, below or between the best bid and the best offer.

39. The system of claim 22, wherein said communication module is further configured to transmit a request from the first computer to the one or more other computers, over an electronic communication network, for bid and offer data on a tradeable object in a financial market.

40. The system of claim 22, wherein said display module is further configured to display a static working orders grid with information about a trader's open orders.

41. The system of claim 40, wherein said static working orders grid displays an indicator indicating whether a trader's open orders may be cancelled.

42. The system of claim 22, wherein said display module is further configured to display an order entry pane.

43. The system of claim 42, wherein said display module is configured to automatically populate fields in said order entry pane in response to a selection of a price level on said table.

44. The system of claim 42, further comprising an order execution module configured to place orders on an exchange, via an electronic communication network, based on data in said order entry pane.

45. The system of claim 22, wherein the display module is configured to display the current bid data and current offer data by displaying a number of the best offers above the first indicator using a first color and displaying a number of the best bids below the first indicator using a second color that is visually distinguishable from the first color.

46. The system of claim 45, wherein the plurality of cells of the second column and of the third column are divided by a plurality of lines into rows, and wherein the first indicator is visually distinguishable from the plurality of lines.

47. The system of claim 46, wherein the display module is further configured to display in the table on the first computer display a second indicator that identifies the best bid in a predetermined time frame and a third indicator that identifies the best offer in the predetermined time frame, wherein the second indicator and the third indicator are visually distinguishable from the plurality of lines.

* * * * *

UNITED STATES PATENT AND TRADEMARK OFFICE
CERTIFICATE OF CORRECTION

PATENT NO. : 9,619,839 B2
APPLICATION NO. : 12/371070
DATED : April 11, 2017
INVENTOR(S) : Jeff Crist It is certified that error appears in the above-identified patent and that said Letters Patent is hereby corrected as shown below:

In the Claims

Column 15, Claim 27, Line 64:    replace "claim 24" with --claim 26--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*